(12) United States Patent
Sun et al.

(10) Patent No.: US 10,595,314 B2
(45) Date of Patent: Mar. 17, 2020

(54) MULTI-SLOT SLOT FORMAT INDICATOR (SFI) EXTENSIONS

(71) Applicant: QUALCOMM Incorporated, San Diego, CA (US)

(72) Inventors: Jing Sun, San Diego, CA (US); Xiaoxia Zhang, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/210,889

(22) Filed: Dec. 5, 2018

(65) Prior Publication Data

US 2019/0200351 A1 Jun. 27, 2019

Related U.S. Application Data

(60) Provisional application No. 62/609,517, filed on Dec. 22, 2017, provisional application No. 62/654,264, filed on Apr. 6, 2018.

(51) Int. Cl.
*H04W 72/04* (2009.01)
*H04B 7/26* (2006.01)
(Continued)

(52) U.S. Cl.
CPC ...... *H04W 72/0446* (2013.01); *H04B 7/2656* (2013.01); *H04L 5/0057* (2013.01);
(Continued)

(58) Field of Classification Search
None
See application file for complete search history.

(56) References Cited

U.S. PATENT DOCUMENTS

2018/0309513 A1\* 10/2018 Kim ................. H04B 7/2643
2019/0053227 A1\* 2/2019 Huang .............. H04L 5/0098
2019/0082427 A1\* 3/2019 Kim ................. H04W 72/042

FOREIGN PATENT DOCUMENTS

EP 3442155 A1 2/2019
WO 2019036634 A1 2/2019

OTHER PUBLICATIONS

International Search Report and Written Opinion—PCT/US2018/064312—ISA/EPO—dated May 10, 2019.
(Continued)

*Primary Examiner* — Noel R Beharry
*Assistant Examiner* — Richard Schnell
(74) *Attorney, Agent, or Firm* — Liem T. Do

(57) ABSTRACT

Wireless communications systems and methods related to multi-slot slot format indicators (SFIs) are provided. In one embodiment, a first wireless communication device communicates, with a second wireless communication device, a first SFI for a first set of slots and a second SFI for a second set of slots overlapping with the first set of slots. The first wireless communication device communicates with the second wireless communication device based on at least one of the first SFI or the second SFI. In one embodiment, a first wireless communication device communicates, with a second wireless communication device, a configuration for a first slot and an SFI indicating slot formats for a set of slots including the first slot. The SFI indicates an unspecified slot format for the first slot. The first wireless communication device communicates with the second wireless communication device in the first slot based on the configuration.

8 Claims, 18 Drawing Sheets

(51) Int. Cl.
*H04W 76/27* (2018.01)
*H04L 5/00* (2006.01)
*H04L 5/14* (2006.01)

(52) U.S. Cl.
CPC .......... *H04L 5/0094* (2013.01); *H04L 5/0096* (2013.01); *H04W 76/27* (2018.02); *H04L 5/0053* (2013.01); *H04L 5/1469* (2013.01)

(56) References Cited

OTHER PUBLICATIONS

NTT Docomo, et al., "Views on Ue Behavior for Group-common PDCCH," 3GPP Draft; R1-1711096, 3rd Generation Partnership Project (3GPP), Mobile Competence Centre; 650, Route Des Lucioles; F06921 Sophia-Antipolis Cedex; France, vol. RAN WG1, no. Qingdao, P.R., China; Jun. 27, 2017-Jun. 30, 2017, Jun. 26, 2017, XP051300296, 3 pages, Retrieved from the Internet: URL:http://www.3gpp.org/ftp/Meetings_3GPP_SYNC/RAN1/Docs/ [retrieved on Jun. 26, 2017].

NTT Docomo., et al: "Remaining Issues on Group-Common PDCCH", 3GPP Draft; R1-1718205, 3rd Generation Partnership Project (3GPP), Mobile Competence Centre, 650, Route Des Lucioles, F-06921 Sophia-Anti Polis Cedex, France, vol. RAN WG1, No. Prague, CZ; Oct. 9, 2017-Oct. 13, 2017, Oct. 8, 2017 (Oct. 8, 2017), XP051341387, 10 Pages, Retrieved from the Internet: URL: http://www.3gpp.org/ftp/Meetings_3GPP_SYNC/RAN1/Docs/ [retrieved on Oct. 8, 2017].

Partial International Search Report—PCT/US2018/064312—ISA/EPO—dated Mar. 13, 2019.

QUALCOMM Incorporated: "Contents of Group Common PDCCH", 3GPP TSG RAN WG1 NR Ad-Hoc-2, R1-1711184, Jun. 2017, pp. 1-6.

QUALCOMM Incorporated: "Remaining Issues on Slot Format Indication", 3GPP Draft; R1-1718556_SFJ_Remaining, 3rd Generation Partnership Project (3GPP), Mobile Competence Centre; 650, Route Des Lucioles; F06921 Sophia-Antipolis Cedex; France, vol. RAN WG1, No. Prague, Czech Republic; Oct. 9, 2017-Oct. 13, 2017 Oct. 8, 2017, XP051341737, Retrieved from the Internet: URL:http://www.3gpp.orgiftp/Meetings_3GPP_SYNC/RAN1/Docs/ [retrieved on Oct. 8, 2017], 12 pages.

* cited by examiner

MULTI-SLOT SLOT FORMAT INDICATOR (SFI) EXTENSIONS

CROSS REFERENCE TO RELATED APPLICATIONS

The present application claims priority to and the benefit of U.S. Provisional Patent Application No. 62/609,517, filed Dec. 22, 2017 and U.S. Provisional Patent Application No. 62/654,264, filed Apr. 6, 2018, each of which is hereby incorporated by reference in its entirety as if fully set forth below and for all applicable purposes.

TECHNICAL FIELD

This application relates to wireless communication systems and methods, and more particularly to communicating slot format information.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

Certain wireless communications systems may support SFI signaling. For example, an SFI may include a set of bits that indicate a format for one or more slots. The format may include whether an OFDM symbol for a slot is configured for uplink, downlink, or unknown communications, e.g., a communication direction for the OFDM symbol. The monitoring period for the SFI (e.g., the time duration or number of slot that the SFI indication covers) can be configured by the network, for example in a radio resource control (RRC) signal. The UE may monitor the control signal to detect the SFI and then use the indicated slot format for wireless communications during the covered slot(s).

While the SFI signaling can provide slot format information for multiple slots in advance, in some instances, a BS may modify a transmission grant and/or cancel a transmission grant after the SFI is being sent. In addition, when the network operates over a medium (e.g., an unlicensed spectrum) shared by multiple network operating entities, a BS is required to perform list-before-talk (LBT) or clear channel assessment (CCA) procedures prior to occupying the medium. The outcomes of the LBT or CCA procedures may not be known to the BS in advance. Further, a network may use semi-persistent scheduling for certain communications. As such, the design of the multi-slot SFIs may need to consider various conditions operating in a licensed spectrum and/or in an unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising communicating, by a first wireless communication device with a second wireless communication device, a first slot format indicator (SFI) for a first set of slots; communicating, by the first wireless communication device with the second wireless communication device, a second SFI for a second set of slots, the second set of slots overlapping with the first set of slots in at least one of time or frequency; and communicating, by the first wireless communication device with the second wireless communication device, a communication signal based on at least one of the first SFI or the second SFI.

In an additional aspect of the disclosure, a method of wireless communication includes communicating, by a first wireless communication device with a second wireless communication device, a configuration for a first slot; communicating, by the first wireless communication device with the second wireless communication device, a slot format indicator (SFI) indicating slot formats for a set of slots including the first slot, wherein the SFI indicates an unspecified slot format for the first slot; and communicating, by the first wireless communication device with the second wireless communication device, a communication signal in the first slot based on the configuration.

In an additional aspect of the disclosure, an apparatus includes a transceiver configured to communicate, with a second wireless communication device, a first slot format indicator (SFI) for a first set of slots; communicate, with the second wireless communication device, a second SFI for a second set of slots, the second set of slots overlapping with the first set of slots in at least one of time or frequency; and communicate, with the second wireless communication device, a communication signal based on at least one of the first SFI or the second SFI.

In an additional aspect of the disclosure, an apparatus includes a transceiver configured to communicate, with a second wireless communication device, a configuration for a first slot; communicate, with the second wireless communication device, a slot format indicator (SFI) indicating slot formats for a set of slots including the first slot, wherein the SFI indicates an unspecified slot format for the first slot; and communicate, with the second wireless communication device, a communication signal in the first slot based on the configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
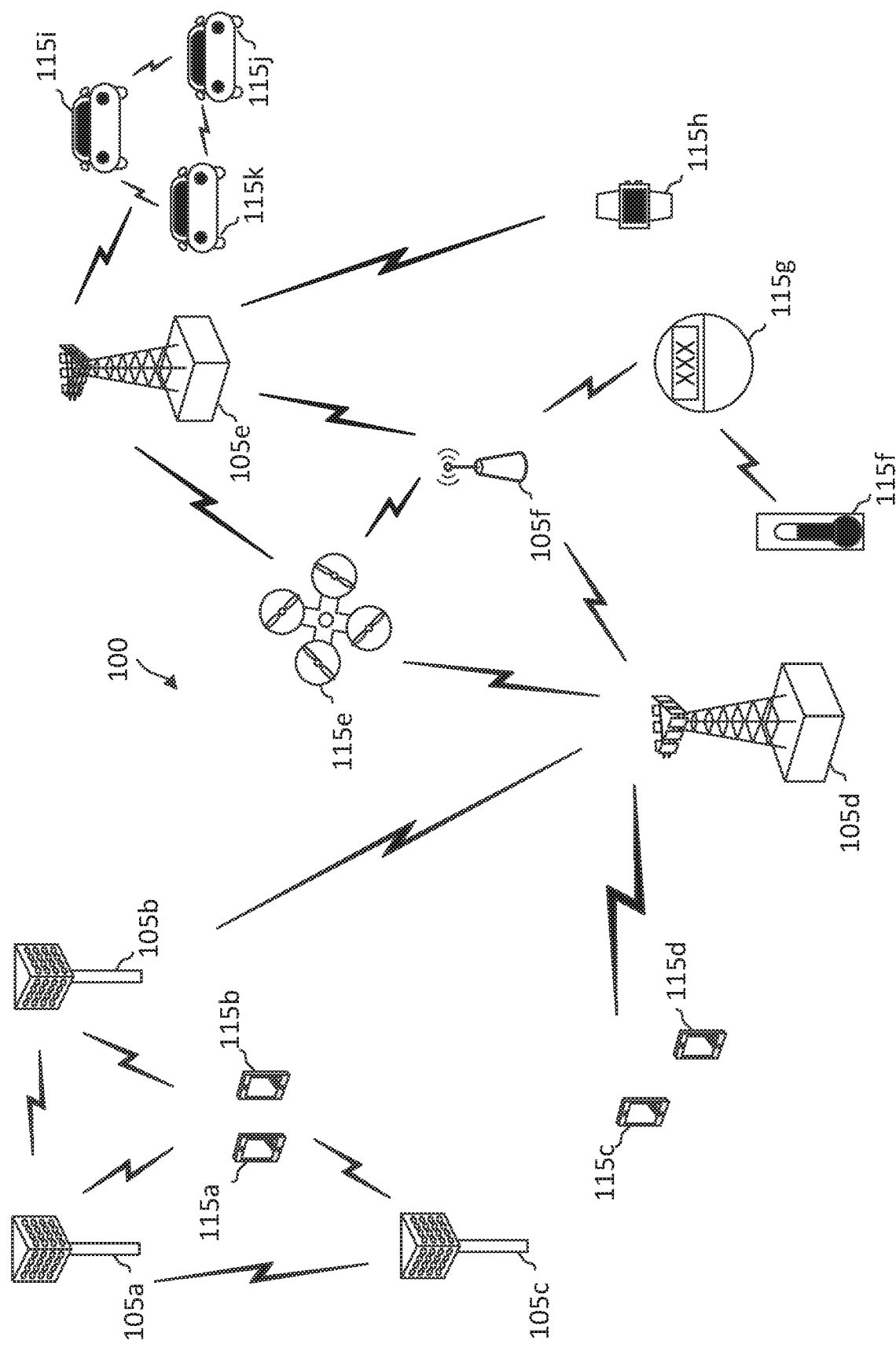
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for communicating slot format information. A BS may transmit an SFI to indicate slot format information for multiple slots and may subsequently communicate with one or more UEs during the multiple slots based the indicated SFI. The BS may transmit the SFI periodically, for example, according to a preconfigured SFI period. The BS may incrementally provide slot format information by transmitting overlapping SFIs. For example, the BS may configure two staggered, overlapping SFI periods, a first SFI period and a second SFI period. The BS may periodically transmit a first SFI according to the first SFI period. The first SFI may indicate slot format information for slots in the first SFI period. The BS may periodically transmit a second SFI according to the second SFI period. The second SFI may indicate slot format information for slots in the second SFI period. The first SFI period and the second SFI period may include one or more common slots.

In one embodiment, the BS may configure the first SFI and the second SFI to indicate the same slot format information for the common slots. In one embodiment, the BS may overwrite (e.g., modify, update, cancel, or dynamically switching between an uplink direction and a downlink direction) slot format information for a common slot indicated in the first SFI (e.g., transmitter earlier in time) by configuring the second SFI with updated slot format information. In one embodiment, the BS may indicate an unspecified slot or communication format (e.g., a wildcard) to instruct a UE to use slot format information in a most recently received SFI or another configuration (e.g., a semi-static UL transmission and/or DL reception schedule) instead of providing additional slot format information.

In one embodiment, the BS may operate in a medium (e.g., an unlicensed spectrum) shared by multiple network operating entities. The BS may include timing information associated with gap time between transmission opportunities (TXOPs). For example, the BS may transmit an SFI during a last slot of a TXOP. The SFI can indicate slot format information for the last slot and one or more slots outside the TXOP. In one embodiment, the BS can configure the SFI to indicate an uplink direction for the one or more slots so that the UE can stop monitoring for downlink signals from the BS for power saving. In one embodiment, the BS can indicate that the one or more slots include the gap time. When the one or more slots extend beyond the gap time, the UE may use slot format information for remaining slots to communicate with the BS in a next TXOP. In one embodiment, the BS can indicate that the slot format information for one or more slots is for communication in beginning slots of a next TXOP.

In one embodiment, the BS may configure SFIs with cross-carrier slot format information. For example, the BS may transmit a first SFI in a first frequency carrier indicating slot format information for the first frequency carrier and a second frequency carrier. The BS may transmit a second SFI in the second frequency carrier indicating slot format information for the second frequency carrier and a third frequency carrier.

Aspects of the present application can provide several benefits. For example, the use of overlapping multi-slot SFIs can enable a BS to incrementally configure and provide slot format information. In addition, the use of overlapping multi-slot SFIs can enable the BS to modify or cancel an earlier slot format configuration or assignment. The use of an unspecified slot or communication format allows the BS to maintain a previous semi-static schedule without having to track and maintain a record of the semi-static schedule and matching SFIs to the semi-static schedule. Further, when the BS operates in a shared spectrum or unlicensed spectrum, the BS can use the multi-slot SFIs to provide slot format information for beginning slots of a next TXOP in advance (e.g., during a current TXOP).

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of 3 dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115*a*-115*d* are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource control (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may be an NR network deployed over an unlicensed spectrum (e.g., in sub-6 GHz bands) shared by multiple network operating entities, which may operate using various wireless technologies such as WiFi, license assisted access (LAA), and MulteFire (MF). The multiple network operating entities may coordinate access to the spectrum. For example, different network operating entities may be assigned with different access priorities during time periods. Each transmitting node (e.g., the BSs 105 and the UEs 115) may perform medium sensing (e.g., listen-before-talk (LBT) or clear channel assessment (CCA)) prior to transmissions in the spectrum to avoid or minimize collisions with other nodes sharing the spectrum. After a BS 105 gains access to a transmission opportunity (TXOP) in the spectrum, the BS 105 may communicate with the UEs 115 using similar mechanisms as in a licensed spectrum described above.

To facilitate the use of scalable numerology or scalable TTIs in the network 100, the BSs 105 may signal SFIs for one or more slots. The SFIs may indicate communication directions for the one or more slots. The SFIs may include a communication direction for each reference signal or each TTI scheduled in the one or more slots. A reference signal may be a physical layer signal (e.g., a predetermined sequence) transmitted in one or more symbols. A TTI refers to a minimum scheduling or grant time period where a medium access control (MAC) layer transport block can be transmitted via a physical layer over the air. Mechanisms for signaling SFIs are described in greater detail herein.

Figure 2:
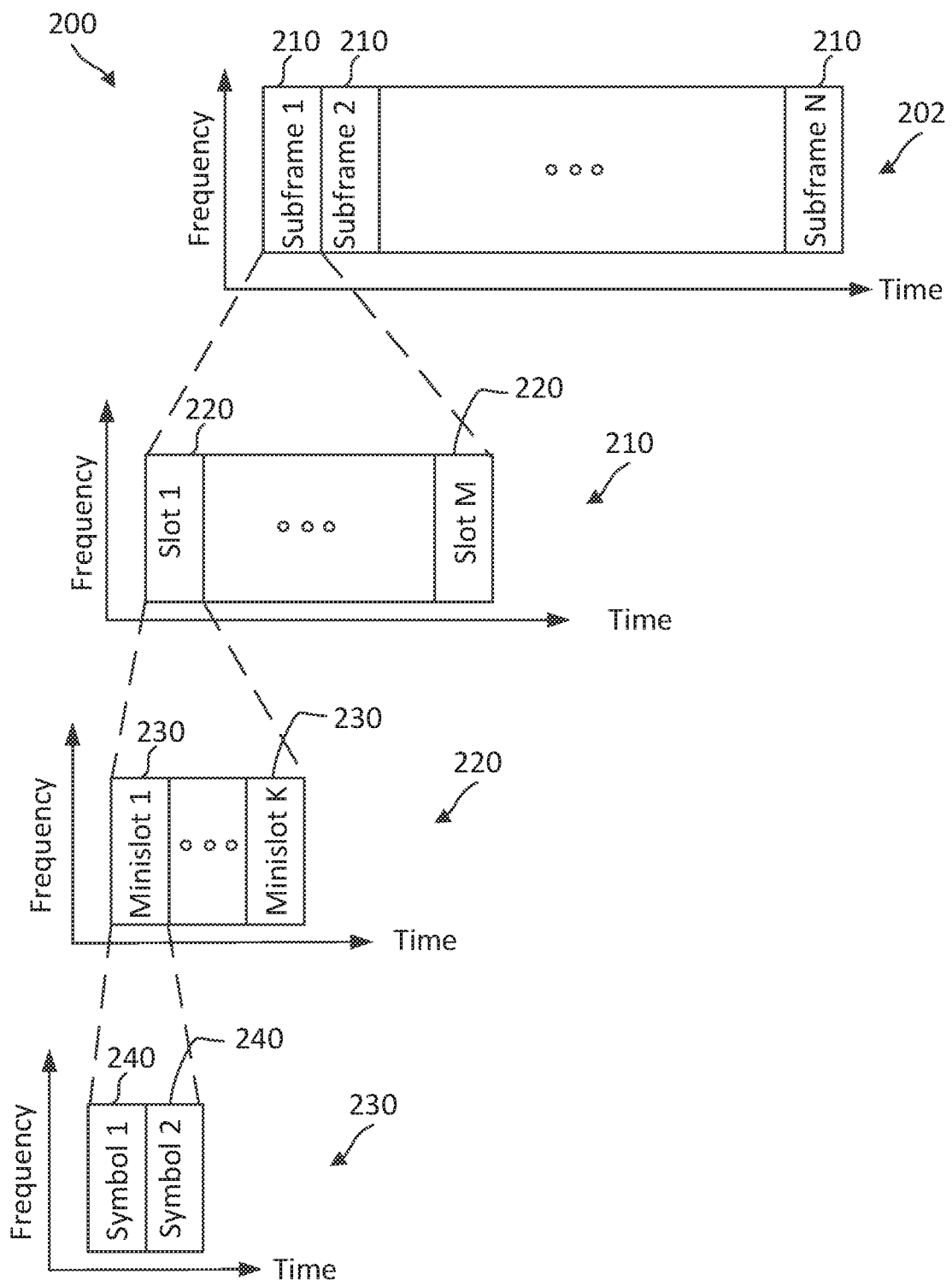
FIG. 2 illustrates a communication frame configuration according to embodiments of the present disclosure.

FIG. 2 illustrates a communication frame configuration 200 according to embodiments of the present disclosure. The configuration 200 may be employed by the networks 100. In particular, BSs such as the BSs 105 and UEs such as the UEs 115 may communicate with each other using the configuration 200. In FIG. 2, the x-axes represent time in some constant units and the y-axes represent frequency in some constant units. The configuration includes a radio frame 202. The radio frame 202 includes N plurality of subframes 210 spanning in time and frequency. In an embodiment, a radio frame 202 may span a time interval of about 10 milliseconds (ms). Each subframe 210 includes M plurality of slots 220. Each slot 220 includes K plurality of mini-slots 230. Each mini-slot 230 may include a variable number of symbols 240. N, M, and K may be any suitable positive integers.

In some embodiments, N may be about 10 and M may be about 14. In other words, a radio frame 202 may include about 10 subframes 210 and each subframe 210 may include about 14 symbols 240. The BSs or the UEs may send data in units of subframes 210, slots 220, or mini-slots 230.

As described above, the BS can transmit an SFI to indicate slot formats for one or more slots 220 to the UE. As an example, the BS may schedule UL and/or DL transmissions in units of one or more symbols 240 (e.g., mini-slots 230). The SFI can indicate a communication direction and/or a duration for each scheduled transmission in one or more slots 220. For example, an SFI may indicate a communication direction of a UL direction, a DL direction, an unknown direction, and/or an unspecified direction. Mechanisms for communications using SFIs are described in greater detail herein.

Figure 3:
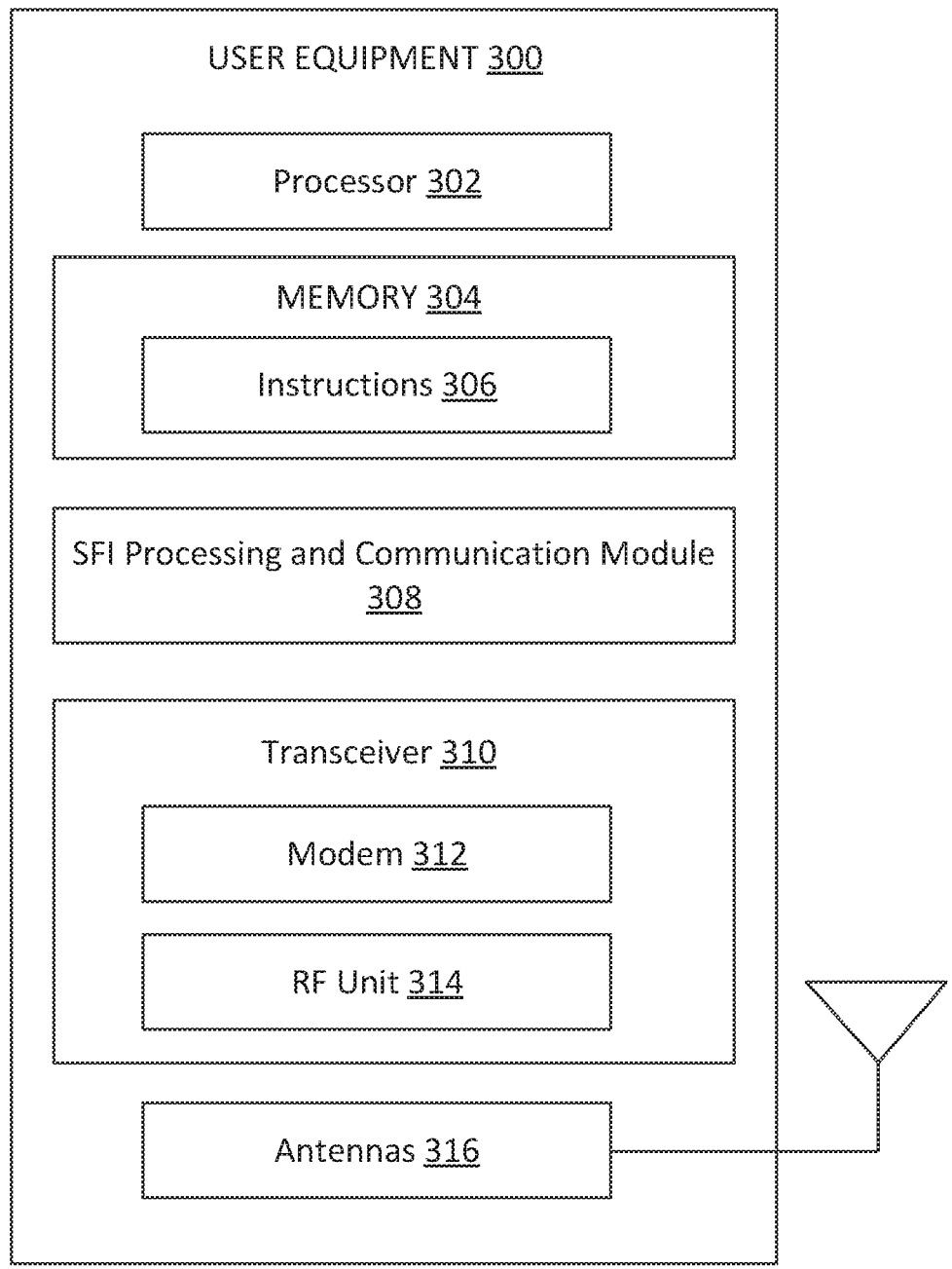
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 as discussed above. As shown, the UE 300 may include a processor 302, a memory 304, an SFI processing and communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SFI processing and communication module 308 may be implemented via hardware, software, or combinations thereof. For example, the SFI processing and communication module 308 may be implemented as a processor, circuit, and/or instructions 306 stored in the memory 304 and executed by the processor 302. The SFI processing and communication module 308 may be used for various aspects of the present disclosure. For example, the SFI processing and communication module 308 is configured to monitor for SFIs from a BS (e.g., the BSs 105) and configure communications with the BS based on detected SFIs. An SFI may include slot format information (e.g., communication directions and/or durations) for multiple slots (e.g., the slots 220, the mini-slots 230, and/or symbols 240).

In some embodiments, a first SFI may include slot format information for a first set of slots and a second SFI may include slot format information for a second set of slots overlapping in time and/or frequency with at least some slot in the first set of slots. The SFI processing and communication module 308 may determine whether to communicate based on the first SFI or the second SFI in the overlapping slots.

In some embodiments, the SFI processing and communication module 308 may receive other configurations (e.g., a semi-static UL transmission and/or DL reception schedule) associated with a communication format for certain slots and determine whether to communicate in the slots based on SFIs received for the slots or the other configurations.

In some embodiments, the UE may communicate with a BS in an unlicensed spectrum. A multi-slot SFI may include slot format information for slots within a current TXOP and/or slots outside the current TXOP. The slots outside the current TXOP may be within a random backoff time of the BS and/or within a subsequent TXOP. In some instances, the SFI processing and communication module 308 may configure the transceiver 310 based on the SFI, for example, to power down or change a power state of at least a receiving portion of the transceiver during the slots within the random backoff time to save power. In some other instances, the SFI processing and communication module 308 may receive SFI signaling configurations from the BS, interpret or process the multi-slot SFIs based on the SFI signaling configuration, and communicate with the BS based on the multi-slot SFIs. Mechanisms for processing SFIs and communicating based on the SFIs.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the SFI processing and communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of communication signals transmitting random access preamble signals and/or scheduling request signal using subbands according to embodiments of the present disclosure. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
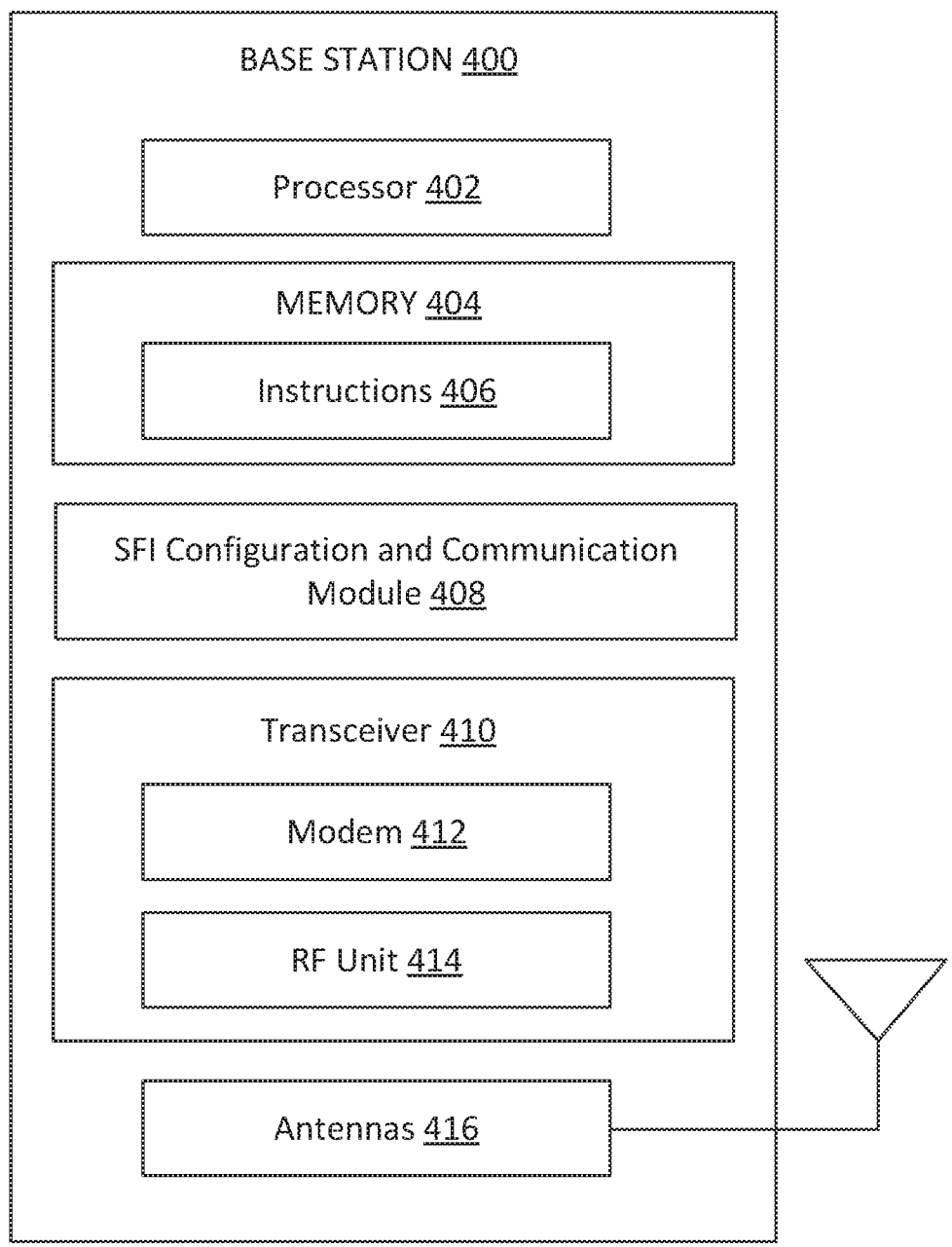
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above. A shown, the BS 400 may include a processor 402, a memory 404, an SFI configuration and communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The SFI configuration and communication module 408 may be implemented via hardware, software, or combinations thereof. For example, the SFI configuration and communication module 408 may be implemented as a processor, circuit, and/or instructions 406 stored in the memory 404 and executed by the processor 402. The SFI configuration and communication module 408 may be used for various aspects of the present disclosure. For example, the SFI configuration and communication module 408 is configured to configure SFIs for one or more slots, transmits the SFIs to UEs (e.g., the UEs 115), and communicate with the UEs based on the SFIs. An SFI may include slot format information (e.g., communication directions and/or durations) for multiple slots (e.g., the slots 220, the mini-slots 230, and/or symbols 240).

In some embodiments, the SFI configuration and communication module 408 may configure a first SFI for a first set of slots and a second SFI for a second set of slots overlapping in time and/or frequency with at least some slot in the first set of slots. The SFI configuration and communication module 408 can use the overlapping multi-slot SFIs to incrementally update the UEs with updated slot format information, for example, to perform dynamic TDD or to cancel an earlier scheduled transmission.

In some embodiments, the SFI configuration and communication module 408 may configure certain slots as UL slots or DL slots via a semi-static schedule and may include an unspecified slot or communication format in an SFI to maintain the earlier configured semi-static schedule.

In some embodiments, the BS may communicate with UEs in an unlicensed spectrum. The SFI configuration and communication module 408 may configure a multi-slot SFI including slot format information for slots within a current TXOP and/or slots outside the current TXOP. In some instances, the SFI configuration and communication module 408 can draw a random number for a random backoff process at the end of the current TXOP. The SFI configuration and communication module 408 can include information associated with the random backoff time in the multi-slot SFIs. For example, the SFI configuration and communication module 408 can convert the random backoff time into a number slots and indicate an uplink direction for the slots within the random backoff time so that the UEs can power down corresponding receivers (e.g., a receiving portion of the transceivers 310) of the UEs during the slots within the random backoff time to save power consumption. In some other instances, the SFI configuration and communication module 408 can transmit SFI signaling configurations to the UEs indicating whether the UEs may skip over the time period where the BS does not have access to the spectrum and use the slot format information in a subsequent TXOP when the BS gain access to the spectrum. Mechanisms for configuring SFIs and communicating based on the SFIs are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
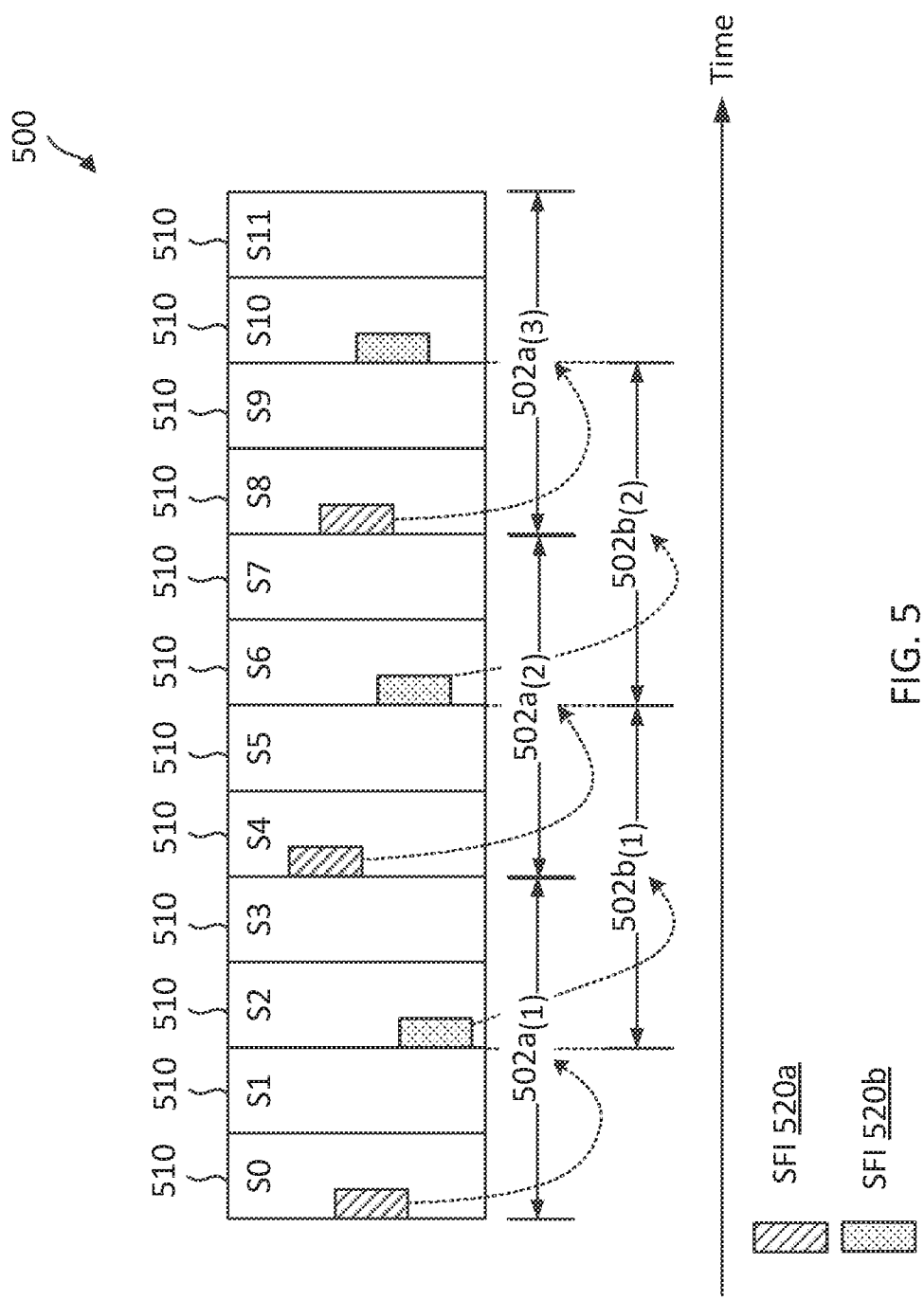
FIG. 5 illustrates an overlapping slot format indicator (SFI) configuration according to embodiments of the present disclosure.

FIG. 5 illustrates an overlapping SFI configuration 500 according to embodiments of the present disclosure. The configuration 500 may be employed by the network 100. The configuration 500 may be implemented by BSs such as the BSs 105 and 400 and UEs such as the UEs 115 and 300. In FIG. 5, the x-axis represents time in some constant units. The configuration 500 includes a plurality of slots 510, for example, indexed S0 to S11. The slots 510 may be similar to the slots 220. For example, each slot 510 may include a plurality of symbols (e.g., the symbols 240).

The configuration 500 may indicate slot format information for the slots 510 using SFIs 520. The slot format information can include a communication direction and/or a duration for one or more symbols within one or more slots 510 and/or any other information associated with numerology of the slots 510. For example, the SFIs 520 can indicate a DL direction for a transmission from a BS to a UE, a UL direction for a transmission from a UE to a BS, an unknown direction, or an unspecified or wildcard direction, as described in greater detail herein.

The SFIs 520 can provide slot format information for slots 510 in an SFI period 502. The SFIs 520 can be periodic, for example, repeated every SFI period 502. Thus, each SFI 520 may indicate slot format information for slots 510 within a corresponding SFI period 502. The configuration 500 provides incremental slot format information by using overlapping SFI periods 502a and 502b. As shown, the SFI periods 502a and 502b are overlapped by two slots 510. For example, the SFI period $502a_{(1)}$ and the SFI period $502b_{(1)}$ have common or overlapping slots 510 indexed S2 and S3.

The SFI period $502b_{(1)}$ and the SFI period $502a_{(2)}$ have overlapping slots 510 indexed S4 and S5. The SFI period $502a_{(2)}$ and the SFI period $502b_{(2)}$ have overlapping slots 510 indexed S6 and S7. The SFI period $502a_{(3)}$ and the SFI period $502b_{(2)}$ have overlapping slots 510 indexed S8 and S9.

As an example, a BS may transmit the SFIs 520a to provide slot format information for the slots 510 in the SFI periods 502a and may transmit the SFIs 520b to provide slot format information for the slots 510 in the SFI periods 502b. As such, a UE may receive slot format information from an SFI 520a and an SFI 520b for a slot 510. The overlapping allows a BS to provide slot format information incrementally and/or to cancel an earlier transmission grant as described in greater detail herein.

In some embodiments, the BS may transmit the SFIs 520 in a group common-physical downlink control channel (GC-PDCCH) portion of a slot 510. The GC-PDCCH portion can carry common DL control information (DCI) for a group of UEs. In some embodiments, the BS may transmit a RRC configuration message indicating a configuration for the SFIs 520. The SFI configuration may indicate a length (e.g., a number of bits) of the SFIs 520, a location (e.g., radio resources) of the SFIs 520 within a GC-PDDCH portion, the slots 510 that include the SFIs 520, and/or the periodicity (e.g., the SFI periods 502) of the SFIs 520. In addition to the SFIs 520, the DCI can include scheduling information, such as radio resource configurations (e.g., time-frequency resources), MCSs, and/or any transmission configuration configurations for UL and/or UL transmission grants for one or more UEs. A UE may configure SFI monitoring periods according to the SFI periods 502a and 502b for SFI detection. The UE may receive the SFIs 520a and 520b and communicate with the BS based on the received SFIs 520a and 520b. Mechanisms for handling the multiple slot format information for the overlapping slots 510 are described in greater detail herein.

Figure 6:
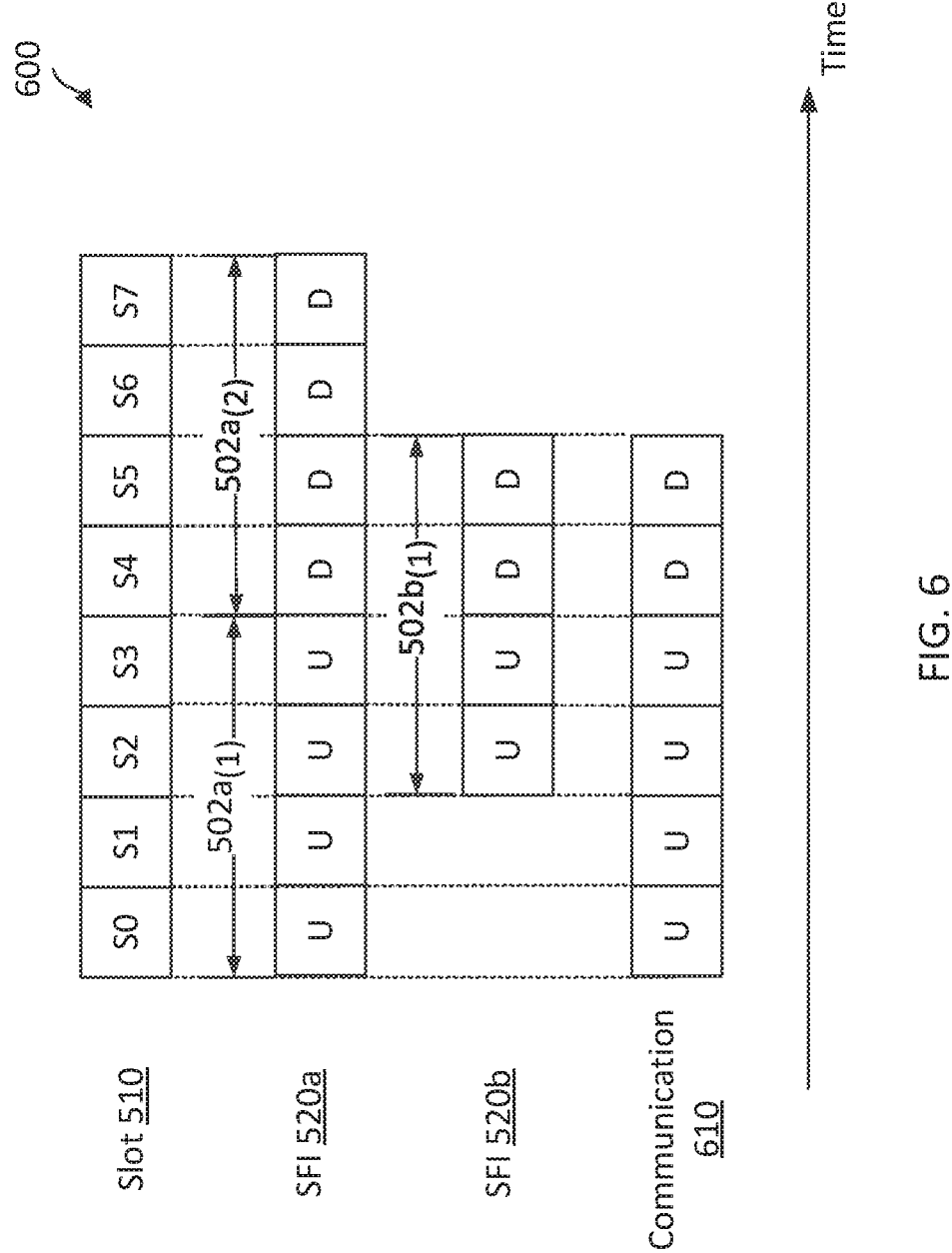
FIG. 6 illustrates a communication scheme using overlapping SFIs according to embodiments of the present disclosure.
Figure 7:
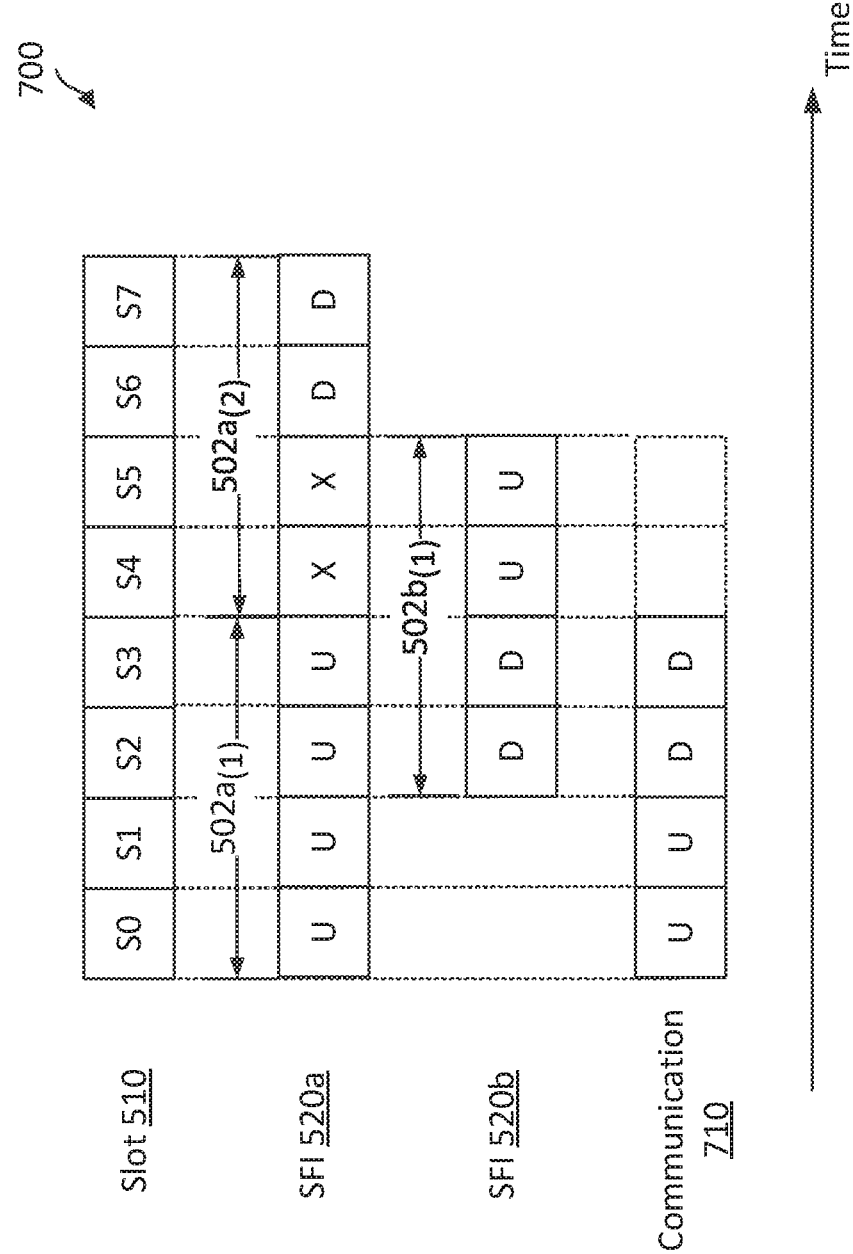
FIG. 7 illustrates a communication scheme using overlapping SFIs according to embodiments of the present disclosure.
Figure 8:
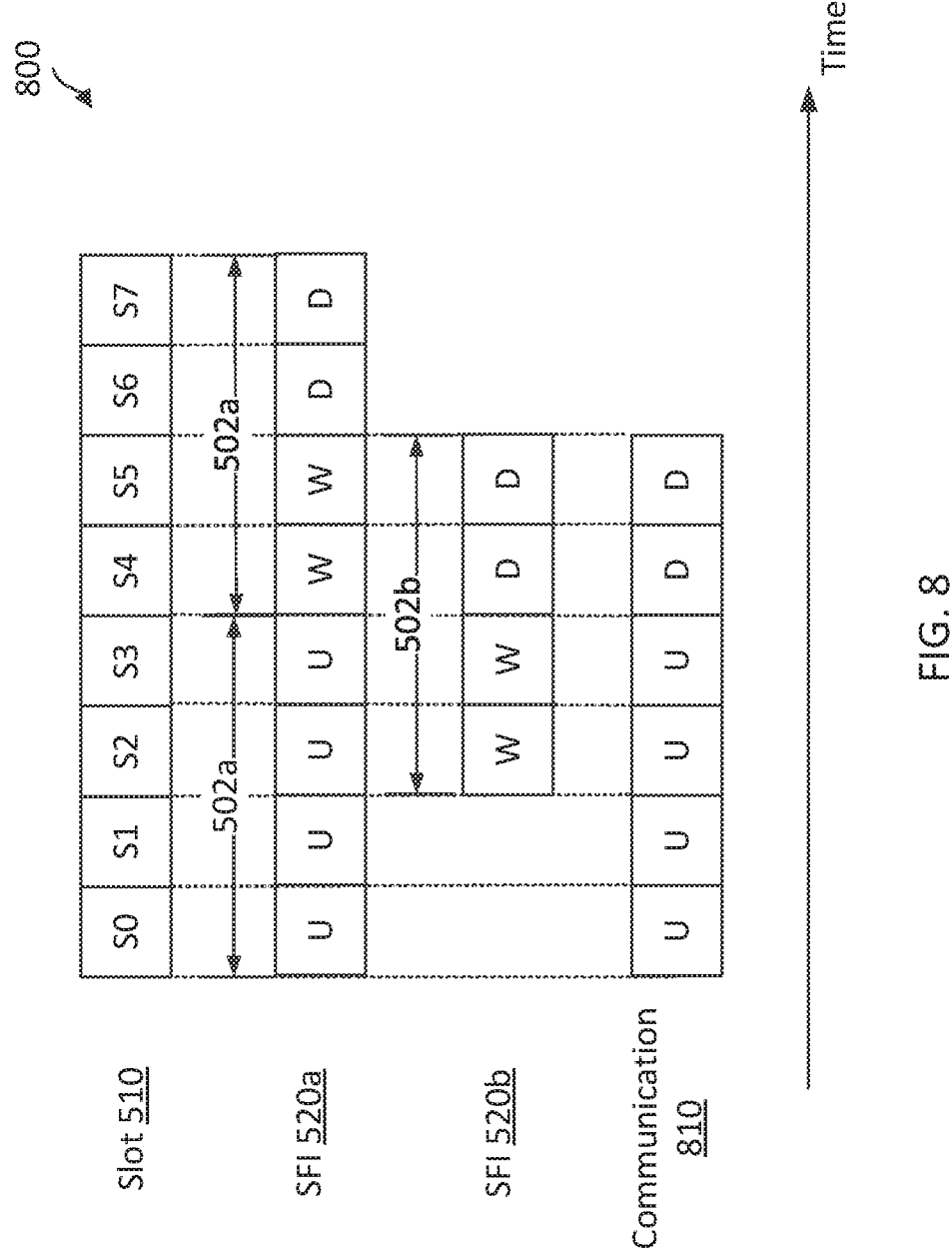
FIG. 8 illustrates a communication scheme using overlapping SFIs according to embodiments of the present disclosure.

FIGS. 6-8 illustrate various mechanisms that can be used for UL and DL communications between BSs (e.g., the BSs 105 and 400) and UEs (e.g., the UEs 115 and 300) when the configuration 500 is used to provide incremental slot format information. In FIGS. 6-8, the x-axes represent time in some constant units. FIGS. 6-8 illustrate a single communication direction (e.g., UL (U), DL (D), unknown (X), unspecified (W)) for each slot 510 for simplicity of discussions, though it will be recognized that embodiments of the present disclosure may scale to include multiple communication directions for each slot 510, for example, switching between a UL direction and a DL direction. In some instances, when a slot 510 includes about 14 symbols (e.g., the symbols 240), an SFI 520 may include up to about 14 communication directions.

FIG. 6 illustrates a communication scheme 600 using overlapping SFIs according to embodiments of the present disclosure. The scheme 600 may be employed by the network 100. The scheme 600 may be implemented by BSs such as the BSs 105 and 400 and UEs such as the UEs 115 and 300. The scheme 600 may be used in conjunction with the configuration 500. In the scheme 600, a BS may provide incremental slot format information using the configuration 500, but the BS is configured to provide consistent slot format information for the overlapping slots 510.

As an example, the BS may transmit an SFI 520a for the SFI period $502a_{(1)}$ indicating UL directions (U) for the slots 510 indexed S0, S1, S2, and S3. Subsequently, the BS may further determine communication directions (e.g., a DL direction (D)) for the slots 510 indexed S4 and S5. The BS may transmit an SFI 520b for the SFI period $502b_{(1)}$ repeating the indications of the UL directions (U) for the slots 510 indexed S2 and S3 and indicating DL directions (D) for the slots 510 indexed S4 and S5. Similarly, the BS may further determine communication direction (e.g., D) for the slots 510 indexed S6 and S7. The BS may transmit an SFI 520a for the SFI period $502a_{(2)}$ repeating the indications of the DL directions (D) for the slots 510 indexed S4 and S5 and indicating DL directions (D) for the slots 510 indexed S6 and S7. As described above, the SFIs 510 and 520 can be carried by DCI via a GC-PDCCH. Accordingly, in some instances, a SFI index field value in a DCI indicates to a UE a slot format for each slot in a number of slots starting from a slot where the UE detects the DCI.

Thus, the BS may communicate with the UE in a UL direction for the slots 510 indexed S0, S1, S2, and S3 and in a DL direction for the slots 510 indexed S4 and S5 based on the SFIs 520a and 520b as shown by the communication 610. As can be seen, the SFIs 520a and 520b provide the same communication directions for the overlapping slots 510. Accordingly, in some instances, when the UE detects more than one DCI formats indicating a slot format for a slot, the UE expects each of the more than one DCI formats indicate a same format (e.g., the same communication direction) for the slot.

FIG. 7 illustrates a communication scheme 700 using overlapping SFIs according to embodiments of the present disclosure. The scheme 700 may be employed by the network 100. The scheme 700 may be implemented by BSs such as the BSs 105 and 400 and UEs such as the UEs 115 and 300. The scheme 700 may be used in conjunction with the configuration 500. Similar to the scheme 600, the scheme 700 may provide incremental slot format information using the configuration 500. However, in the scheme 700, a BS can modify an earlier slot format configuration.

As an example, the BS may transmit an SFI 520a for the SFI period $502a_{(1)}$ indicating UL directions (U) for the slots 510 indexed S0, S1, S2, and S3. Subsequently, the BS may further determine communication directions (e.g., U) for the slots 510 indexed S4 and S5. In addition, the BS may determine to switch the communication directions from UL to DL (e.g., dynamic TDD) for the slots 510 indexed S2 and S3. The BS may transmit an SFI 520b for the SFI period $502b_{(1)}$ indicating DL directions (D) for the slots 510 indexed S2 and S3 and UL directions (U) for the slots 510 indexed S4 and S5. Similarly, the BS may further determine communication directions (e.g., D) for the slots 510 indexed S6 and S7. In addition, the BS may determine to cancel the previous DL transmission configurations or grants for the slots 510 indexed S4 and S5. The BS may transmit an SFI 520a for the SFI period $502a_{(2)}$ indicating DL directions (D) for the slots 510 indexed S6 and S7 and indicating unknown directions (X) for the slots 510 indexed S4 and S5.

A UE may monitor for the SFIs 520a and 520b according to the SFI periods 502a and 502b, respectively. The UE may be configured to communicate based on a most recently received SFIs 520. In other words, a current SFI 520 can overwrite the slot format information of a previous SFI 520 for the common overlapping slots. Thus, the BS may communicate with the UE in a UL direction for the slots 510 indexed S0 and S1 and in a DL direction for the slots 510 indexed S2, and S3 as shown by the communication 710. In addition, there may be no communication between the BS and the UE during the slots 510 indexed S4 and S5 as shown by the dashed boxes due to the cancellation.

As can be seen, the scheme 700 can provide up to six different combinations of slot format modifications. For example, a slot format can be modified from D to U, D to X, U to D, U to X, X to D, or X to U. In some embodiment, the scheme 700 may allow certain format modifications, but not all combinations. For example, the scheme 700 may allow a slot format modification from X to D, but not from X to U. In some other embodiments, the scheme 700 may allow a slot format to be modified using any of the six combinations.

FIG. 8 illustrates a communication scheme 800 using overlapping SFIs according to embodiments of the present disclosure. The scheme 800 may be employed by the network 100. The scheme 800 may be implemented by BSs such as the BSs 105 and 400 and UEs such as the UEs 115 and 300. The scheme 800 may be used in conjunction with the configuration 500. Similar to the schemes 600 and 700, the scheme 800 may provide incremental slot format information using the configuration 500. However, in the scheme 800, a BS can reduce signaling overhead by indicating an unspecified communication direction (e.g., a wildcard format) to direct a UE to use an earlier slot format configuration.

As an example, the BS may transmit an SFI 520a for the SFI period $502a_{(1)}$ indicating UL directions (U) for the slots 510 indexed S0, S1, S2, and S3. Subsequently, the BS may further determine communication directions (e.g., D) for the slots 510 indexed S4 and S5 and keep the earlier slot format configuration (e.g., U) for the slots 510 indexed S2 and S3. The BS may transmit an SFI 520b for the SFI period $502b_{(1)}$ indicating unspecified directions (W) for the slots 510 indexed S2 and S3 and DL directions (D) for the slots 510 indexed S4 and S5. Similarly, the BS may further determine communication directions (e.g., D) for the slots 510 indexed S6 and S7 and keep the earlier slot format configuration (e.g., D) for the slots 510 indexed S4 and S5. The BS may transmit an SFI 520a for the SFI period $502a_{(2)}$ indicating unspecified directions (W) for the slots 510 indexed S4 and S5 and indicating DL directions (D) for the slots 510 indexed S6 and S7.

A UE may monitor for the SFIs 520a and 520b according to the SFI periods 502a and 502b, respectively. The UE may be configured to communicate based on a previous slot format configuration when receiving an indication of an unspecified direction. Thus, the BS may communicate with the UE in a UL direction for the slots 510 indexed S0 to S3 and in a DL direction for the slots 510 indexed S4 and S5 as shown by the communication 810.

Figure 9:
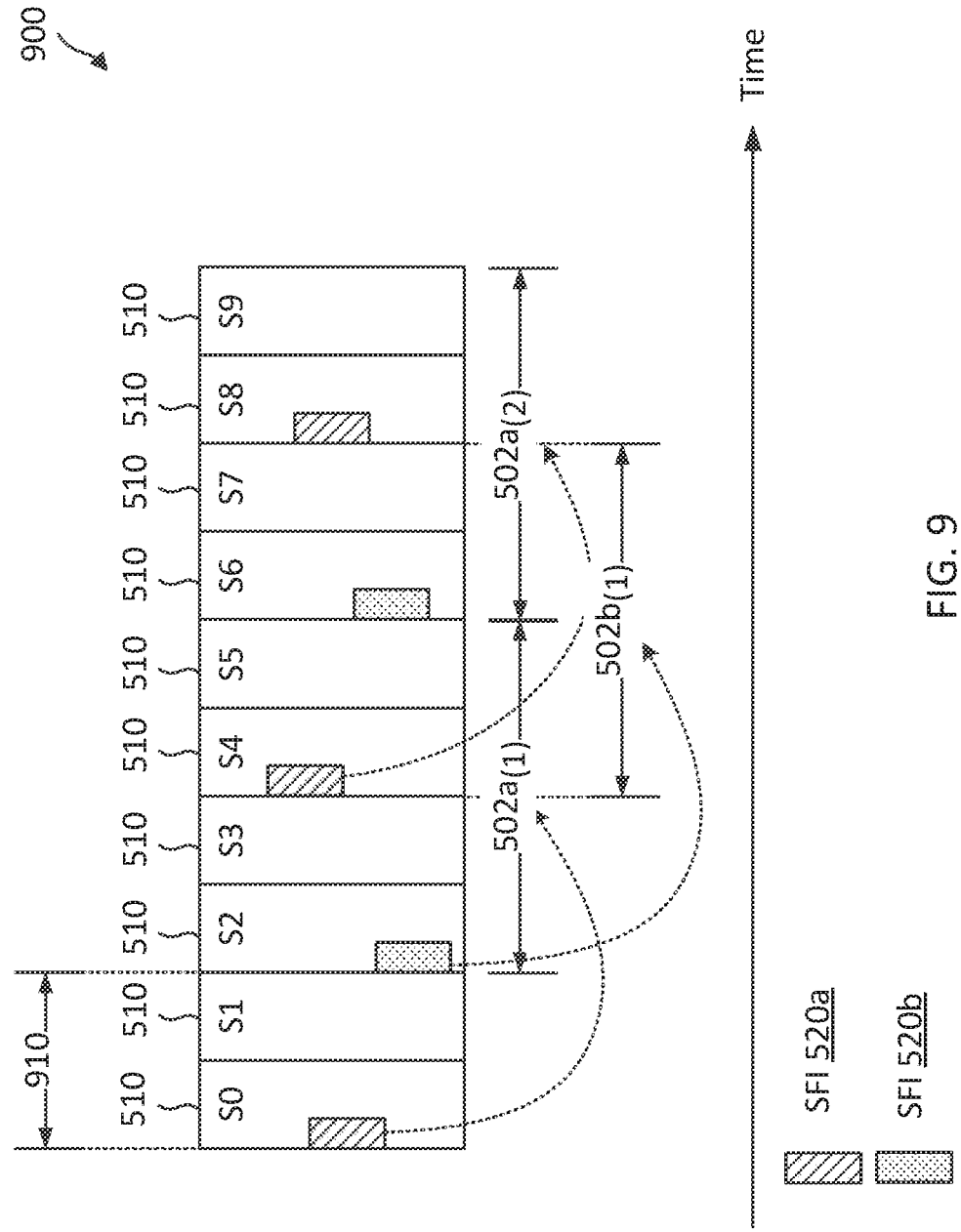
FIG. 9 illustrates an overlapping SFI configuration according to embodiments of the present disclosure.

FIG. 9 illustrates an overlapping SFI configuration 900 according to embodiments of the present disclosure. The configuration 900 may be employed by the network 100. The configuration 900 may be implemented by BSs such as the BSs 105 and 400 and UEs such as the UEs 115 and 300. The configuration 900 is similar to the configuration 500. For example, a BS may transmit SFIs 520 for SFI periods 502 including overlapping slots 510. However, in the configuration 900, a BS may transmit an SFI 520 for an SFI period 502 during a slot 510 earlier in time than the SFI period 502 by a time period 910, for example, including about two slots 510.

As an example, the BS may transmit an SFI 520a for an SFI period $502a_{(1)}$ during a slot 510 indexed S0, where the SFI period $502a_{(1)}$ includes slots 510 indexed S2 to S5. Subsequently, the BS may transmit an SFI 520b for an SFI period $502b_{(1)}$ during a slot 510 indexed S2, where the SFI period $502b_{(1)}$ includes slots 510 indexed S4 to S7. The early SFI indication can allow a UE to obtain slot format information in advance and prepare or configure the slots in advance. For example, the UE may require certain processing time to decode a received SFI 520, to prepare for a UL transmission, to cancel a UL transmission, and/or to cancel a DL reception.

Figure 10:
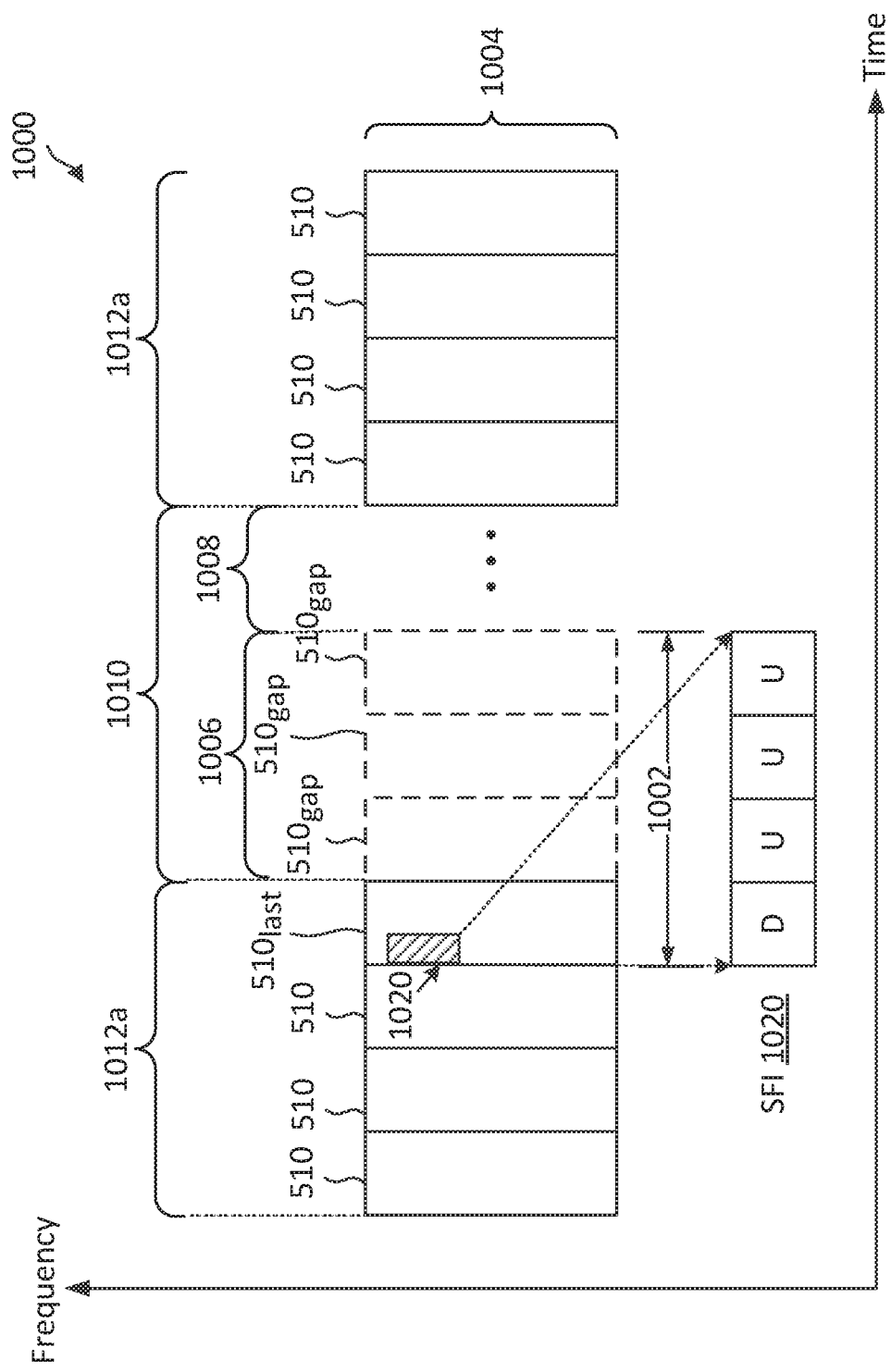
FIG. 10 illustrates an SFI configuration that extends outside of a transmission opportunity (TXOP) according to embodiments of the present disclosure.
Figure 11:
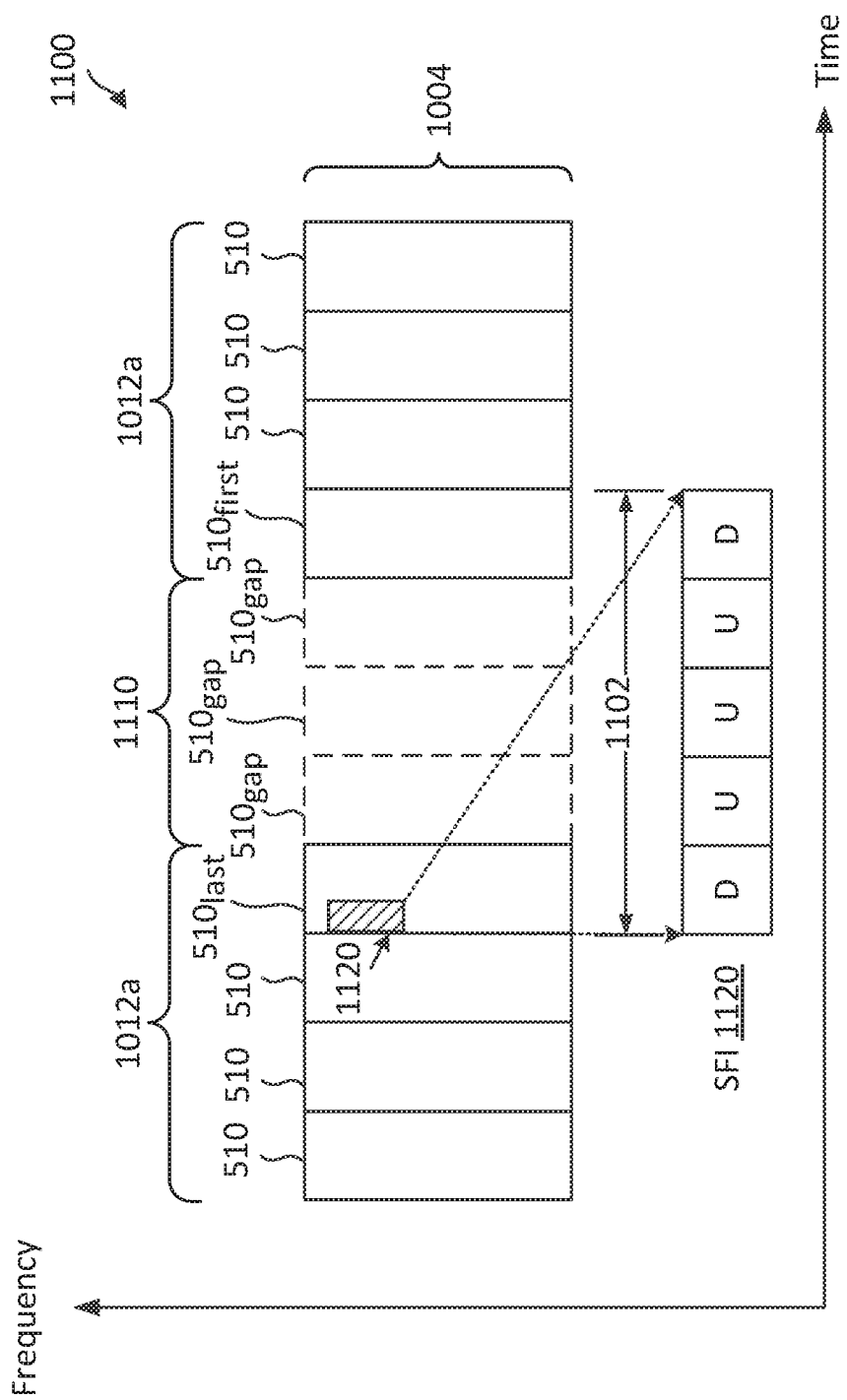
FIG. 11 illustrates an SFI configuration that extends across TXOPs according to embodiments of the present disclosure.
Figure 12:
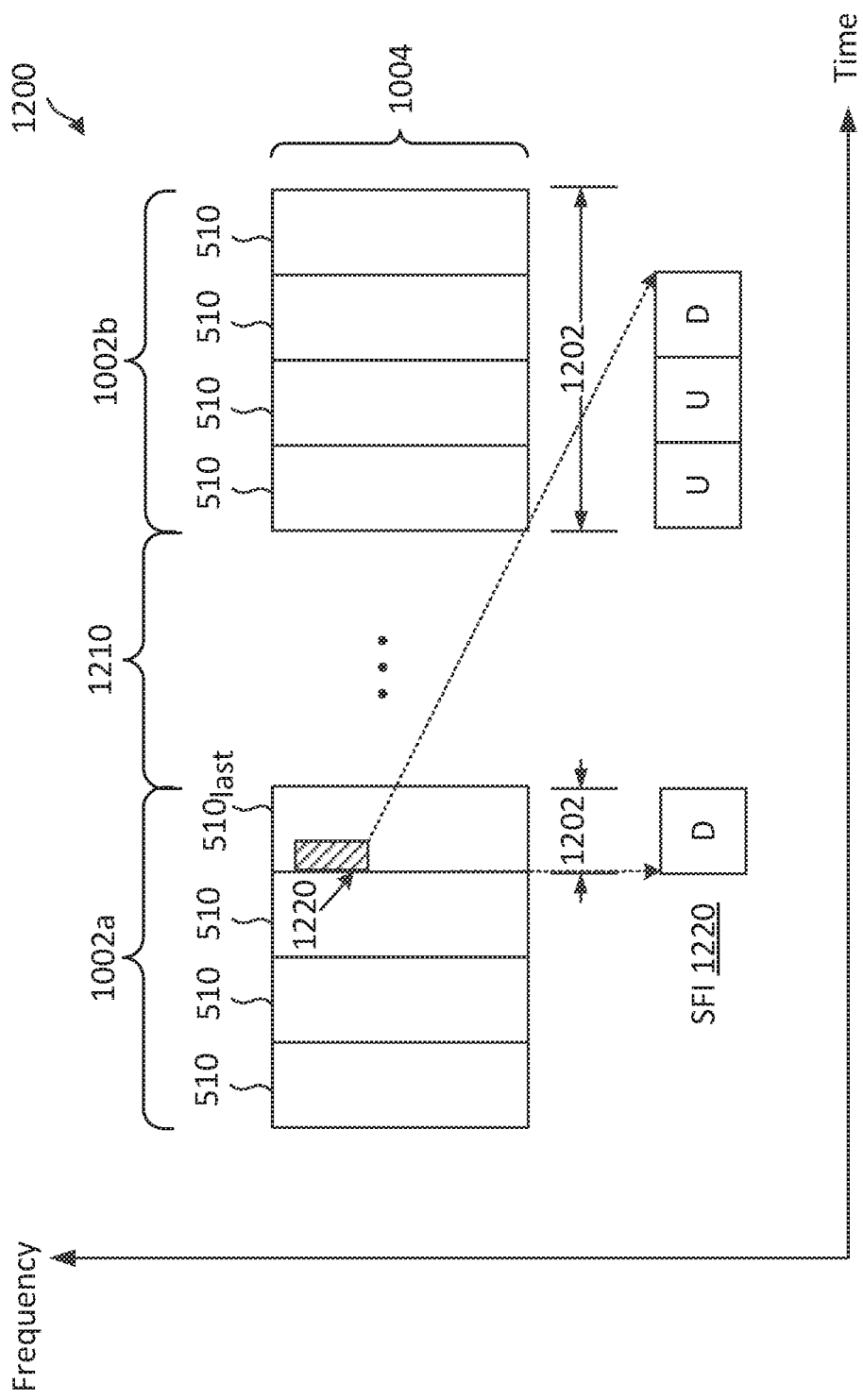
FIG. 12 illustrates an SFI configuration that extends across TXOPs according to embodiments of the present disclosure.

FIGS. 10-13 illustrate various mechanisms for communicating SFIs in a communication medium (e.g., an unlicensed spectrum) shared by multiple network operating entities. In FIGS. 10-12, the x-axes represent time in some constant units and the y-axes represents frequency in some constant units.

FIG. 10 illustrates an SFI configuration 1000 that extends outside of a TXOP according to embodiments of the present disclosure. The configuration 1000 may be employed by the network 100. The configuration 1000 may be implemented by BSs such as the BSs 105 and 400 and UEs such as the UEs 115 and 300. When operating in a shared frequency spectrum 1004, communications may be in units of TXOPs 1012. Each TXOP 1012 may be divided into slots 510. For example, the duration of the TXOPs 1012 may be configured based on a certain usage regulation or agreement for the frequency spectrum 1004. In some instances, a TXOP 1012 may include a duration of about 5 ms or about 10 ms. In addition, a BS may perform a LBT procedure prior to accessing the frequency spectrum 1004. Thus, the BS may communicate with a UE in TXOPs 1012 (e.g., the TXOPs 1012a and 1012b) separated by a gap period 1010 where the BS may not have access to the frequency spectrum 1004. For example, a BS may perform a random backoff at the end of a TXOP 1012. Thus, the gap period 1010 may vary depending on the random backoff. In the configuration 1000, the BS may include information associated with a minimum time of the gap time period 1010 in an SFI 1020. The SFI 1020 may be substantially similar to the SFIs 520.

As an example, the BS may transmit an SFI 1020 for an SFI period 1002 (e.g., the SFI periods 502) in a last slot 510 (shown as $510_{last}$) of the TXOP 1012a. Similar to the configuration 500, the BS may transmit the SFI 1020 in a GC-PDCCH portion of the slot $510_{last}$. The BS may draw a random number for a next random backoff process (e.g., based on a contention window size) in advance. For example, the BS may draw the random number before generating the SFI 1020 instead of at the end of the TXOP 1012a. The BS may map the random number into a random backoff time period 1006. The BS may determine a number of slots 510 corresponding to the random backoff time period 1006. For example, the random backoff time period 1006 may correspond to a duration of about three slots 510 (shown as $510_{gap}$). The BS may configure the SFI period 1002 to include the random backoff time period 1006. The BS may transmit an SFI 1020 indicating communication directions for the last slot $510_{last}$ and the slots $510_{gap}$ in the random backoff time period 1006. To enable power saving at a UE, the BS may indicate a UL direction (U) for the slots $510_{gap}$ in the random backoff time period 1006. For example, upon detecting UL directions for the slots $510_{gap}$, the UE may bypass monitoring of DL signaling from the BS during the slots $510_{gap}$. The UE may power down at least some of the receiver components (e.g., frontend) of the UE during the slots $510_{gap}$, and thus may reduce power consumption at the UE. However, the BS may not have knowledge about the outcome of the LBT after the random backoff. For example, the BS may fail to gain access to the spectrum 1004 after the random backoff time period 1006. The BS may wait for another random backoff time period 1008 before gaining a next TXOP 1012b in the spectrum 1004. Thus, the SFI 1020 may include information associated with a minimum time (e.g., corresponding to the random backoff time period 1006) of the gap period 1010.

While FIG. 10 illustrates the SFI 1020 transmitted in the last slot $510_{last}$ of the TXOP 1012a, the SFI 1020 may be transmitted in any slot 510 of the TXOP 1012a and may include slot format information for any suitable number of slots 510 outside the TXOP 1012.

FIG. 11 illustrates an SFI configuration 1100 that extends across TXOPs according to embodiments of the present disclosure. The configuration 1100 may be employed by the network 100. The configuration 1100 may be implemented by BSs such as the BSs 105 and 400 and UEs such as the UEs 115 and 300. The configuration 1100 is substantially similar to the configuration 1000. However, in the configuration 1100, a BS may indicate an SFI 1120 including slot format information for a current TXOP 1012a and a next TXOP 1012b. The SFI 1120 may be substantially similar to the SFIs 520 and 1020.

Similar to the configuration 1000, the BS may transmit an SFI 1120 for an SFI period 1102 in a last slot 510 (shown as $510_{last}$) of the TXOP 1012a. However, the SFI 1120 may include slot format information for number of slots 510 including the $510_{last}$ of the TXOP 1012a, a gap time period 1110 (e.g., the gap time period 1010) between the TXOP 1012a and the next TXOP 1012b, and a slot 510 (shown as $510_{first}$) in the next TXOP 1012b. As shown, the SFI period 1202 extends across the two TXOPs 1012a and 1012b including the gap time period 1110. Similar to the configuration 1000, the SFI 1120 may indicate a UL direction for the slots $510_{gap}$ to enable power saving at the UE. For example, when the UE detect the SFI 1120, the UE may communicate with the BS in the slot $510_{last}$ of the TXOP 1012a based on the SFI 1120 (e.g., in a DL direction as shown). The UE may bypass monitoring of DL signaling during the slots $510_{gap}$. When the BS gain access to the spectrum 1004 in the next TXOP 1012b, the UE may communicate with the BS in the slot $510_{first}$ of the TXOP 1012b based on the SFI 1120 received in the previous TXOP 1012a.

While FIG. 11 illustrates the SFI 1120 transmitted in the last slot $510_{last}$ of the TXOP 1012a, the SFI 1120 may be transmitted in any slot 510 of the TXOP 1012a and may include slot format information for any suitable number of slots 510 in the TXOP 1012a and the next TXOP 1012b.

FIG. 12 illustrates an SFI configuration 1200 that extends across TXOPs according to embodiments of the present disclosure. The configuration 1200 may be employed by the network 100. The configuration 1200 may be implemented by BSs such as the BSs 105 and 400 and UEs such as the UEs 115 and 300. The configuration 1200 is substantially similar to the configurations 1000 and 1100. However, in the configuration 1200, a BS may instruct a UE to skip over a gap time period 1210 between TXOPs 1012 when applying slot format information in an SFI 1220.

Similar to the configurations 1000 and 1100, the BS may transmit an SFI 1220 for an SFI period 1202 in a last slot 510 (shown as $510_{last}$) of the TXOP 1012a. However, the SFI 1220 may not include information associated with a gap time period 1210 between the TXOP 1012a and a next TXOP 1012b. As shown, the SFI period 1202 extends across the two TXOPs 1012a and 1012b skipping over the gap time period 1210. The SFI 1220 includes slot format information for the slot $510_{last}$ of the TXOP 1012a and the first three slots 510 of the next TXOP 1212b. For example, when the UE detect the SFI 1220, the UE may communicate with the BS in the slot $510_{last}$ of the TXOP 1012a based on the SFI 1220 (e.g., in a DL direction as shown). The UE may skip over the gap time period 1210. When the BS gain access to the spectrum 1004 in the next TXOP 1012b, the UE may communicate with the BS in the first three slots 510 of the TXOP 1012b based on remaining slot format information in the SFI 1220 received from the previous TXOP 1012a.

While FIG. 12 illustrates the SFI 1220 transmitted in the last slot $510_{last}$ of the TXOP 1012a, the SFI 1220 may be transmitted in any slot 510 of the TXOP 1012a and may include slot format information for any suitable number of slots 510 in the TXOP 1012a and the next TXOP 1012b.

Figure 13:
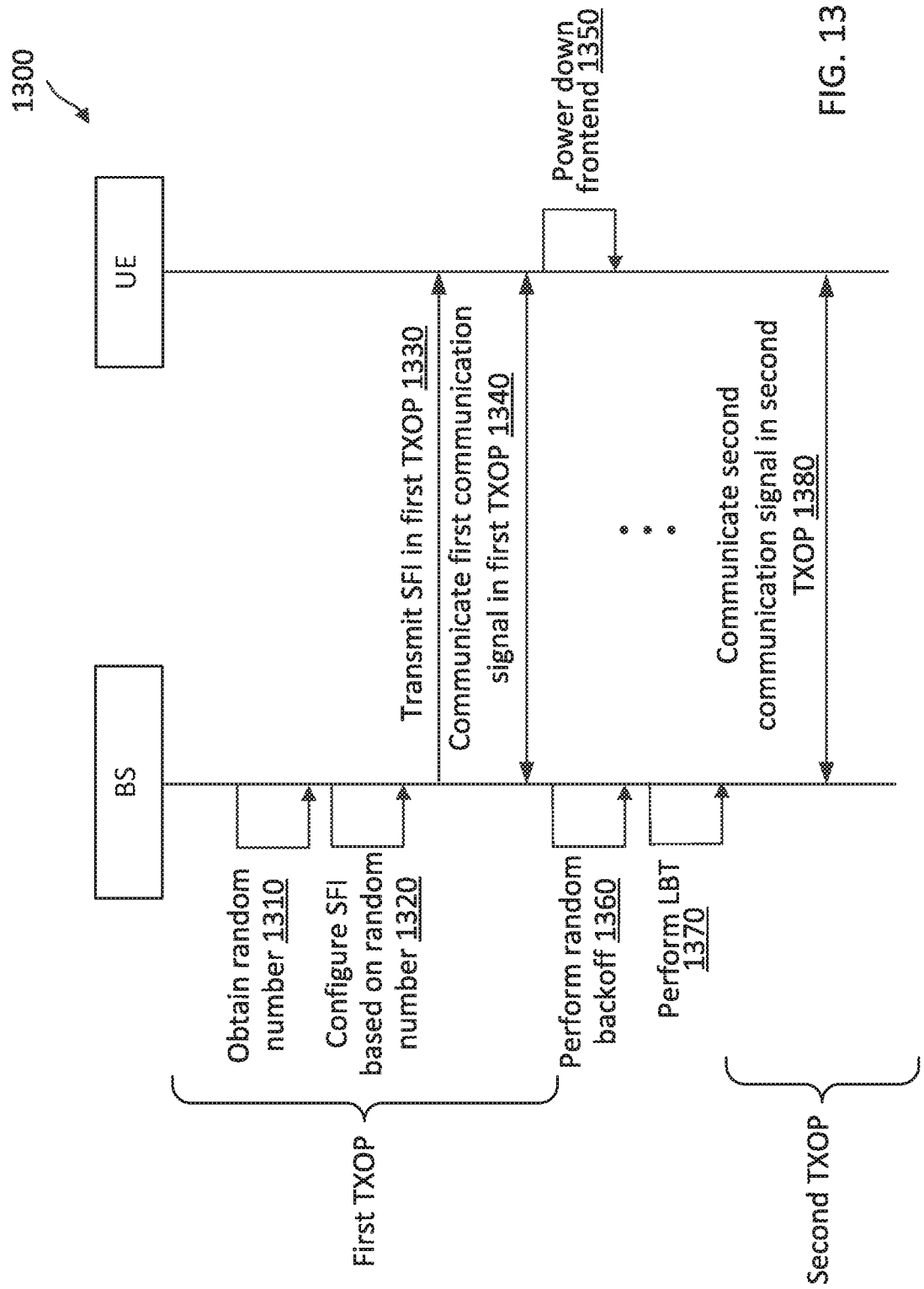
FIG. 13 is a signaling diagram of a communication method according to some embodiments of the present disclosure.

FIG. 13 is a signaling diagram of a communication method 1300 according to some embodiments of the present disclosure. The method 1300 is implemented by a BS (e.g., the BSs 105 and 400) and a UE (e.g., the UEs 115 and 300) in a network (e.g., the network 100) operating over a medium (e.g., the frequency spectrum 1004) shared by multiple network operating entities. The method 1300 may employ similar mechanisms as in the configurations 1000 and 1100 described with respect to FIGS. 10 and 11. Steps of the method 1300 can be executed by computing devices (e.g., a processor, processing circuit, and/or other suitable component) of the BS and the UE. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the BS may obtain a random number for a random backoff during a first TXOP (e.g., the TXOP 1012a). For example, the BS may draw a random number between 0 and a value based on a contention window size.

At step 1320, the BS may configure an SFI (e.g., the SFIs 1020, 1120, and 1220) based on the random number. For example, the BS may map the random number into a time duration (e.g., the random backoff time period 1006) and determine a number of slots (e.g., the slots $510_{gap}$) corresponding to the time duration. The BS may configure the SFI to indicate UL directions for the slots corresponding to the random backoff time duration. The SFI may include slot format information for one or more slots (e.g., the slot $510_{last}$) within a current TXOP (e.g., the TXOP 1012a) depending on when the SFI is transmitted in the first TXOP and/or one or more slots for a second, next TXOP (e.g., the TXOP 1012b).

At step 1330, the BS may transmit the SFI in the first TXOP, for example, during a last slot of the current TXOP.

At step 1340, the BS may communicate with the UE in the first TXOP, for example, in the last slot of the current TXOP, based on the SFI.

At step 1350, upon receiving the SFI indicating the slots assigned with the UL directions, the UE may bypass DL signaling monitoring during the slots for power saving.

At step 1360, at the end of the first TXOP, the BS may perform a random backoff based on the random number. For example, the BS may wait for a duration corresponding to the random backoff time period.

At step 1370, when the random backoff time period expires, the BS may perform an LBT procedure. For example, the BS may determine that the medium is clear and gain access to the spectrum for a next second TXOP.

At step 1380, the BS may communicate with the UE in the second TXOP. In some instances, the BS may communicate with the UE based on remaining slot format information in the SFI.

Figure 14:
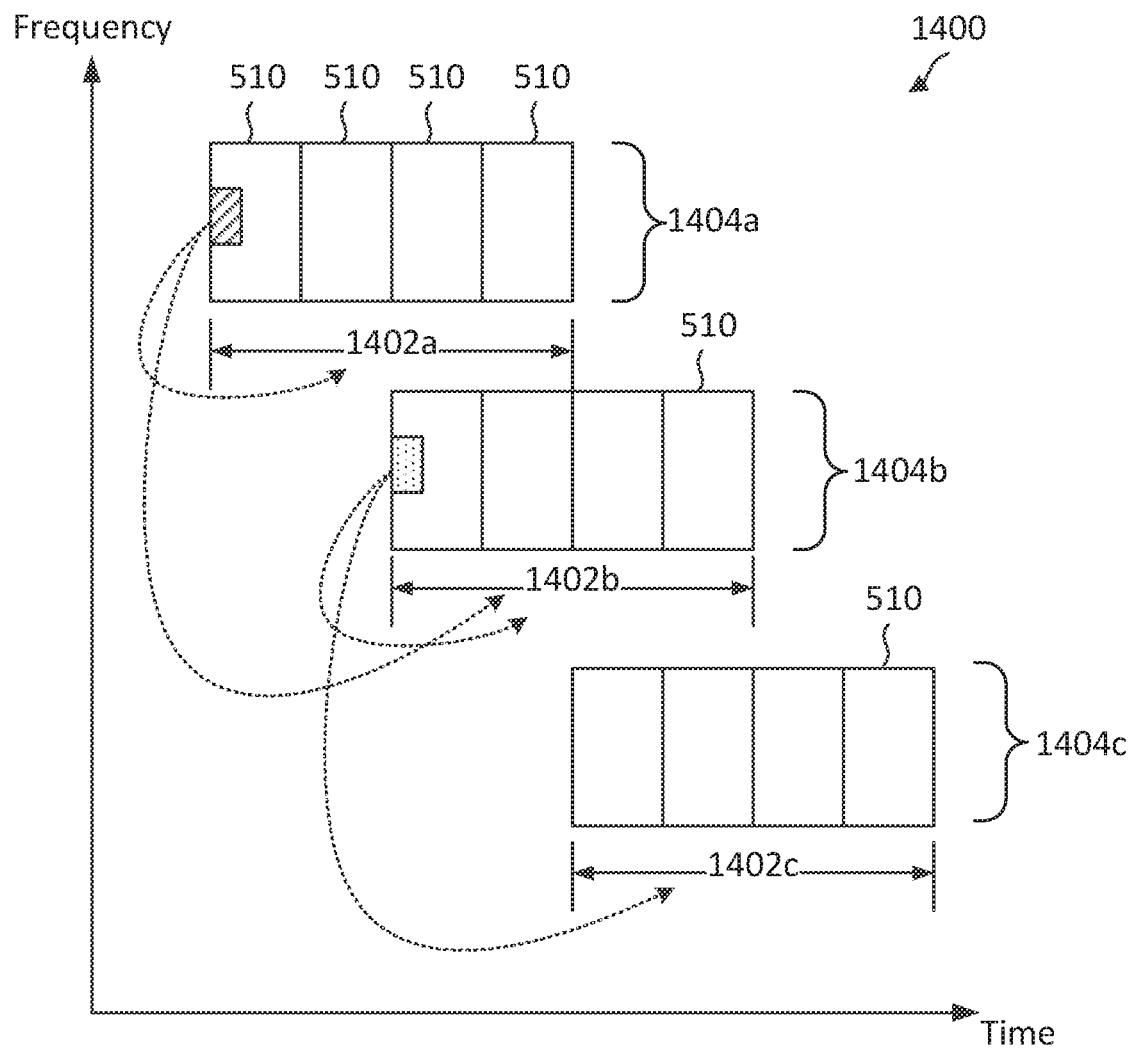
FIG. 14 illustrates a cross-carrier SFI configuration according to embodiments of the present disclosure.

FIG. 14 illustrates a cross-carrier SFI configuration 1400 according to embodiments of the present disclosure. The configuration 1400 may be employed by the network 100. The configuration 1400 may be implemented by BSs such as the BSs 105 and 400 and UEs such as the UEs 115 and 300. In FIG. 14, the x-axis represents time in some constant units, and the y-axis represents frequency in some constant units. The configuration 1400 includes a plurality of slots 510 in a plurality of frequency carriers 1404. The slots 510 across the different frequency carriers 1404 may be time-aligned. FIG. 14 illustrates three frequency carriers 1404a, 1404b, and 1404c for simplicity of discussions, though it will be recognized that embodiments of the present disclosure may scale to include any suitable number of frequency carriers 1404, for example, about four, five or more.

The configuration 1400 includes a plurality of SFIs 1420. The SFIs 1420 may be substantially similar to the SFIs 520, 1020, 1120, and 1220. For example, each SFI 1420 may include slot format information (e.g., communication directions and durations) for a plurality of slots 510. An SFI 1420 may be communicated in a GC-PDCCH portion of a slot 510. However, in the configuration 1400, an SFI 1420 may include cross-carrier slot format information.

As an example, a BS may transmit an SFI 1420a in the frequency carrier 1404a and an SFI 1420b in the frequency carrier 1404b. The SFI 1420a may include slot format information for one or more slots 510 in the frequency carrier 1404b within an SFI period 1402a and one or more slots 510 in the frequency carrier 1404b with an SFI period 1402b. The SFI 1420b may include slot format information for one or more slots 510 in the frequency carrier 1404b within an SFI period 1402b and one or more slots 510 in the frequency carrier 1404c with an SFI period 1402c. As can be seen, the slot format information for the slots 510 in the frequency carrier 1404b is indicated by the SFI 1420a and SFI 1420b. The BS may communicate with a UE using similar mechanisms described in the schemes 600, 700, and 800 described with respect to FIGS. 6, 7, and 8, respectively.

Figure 15:
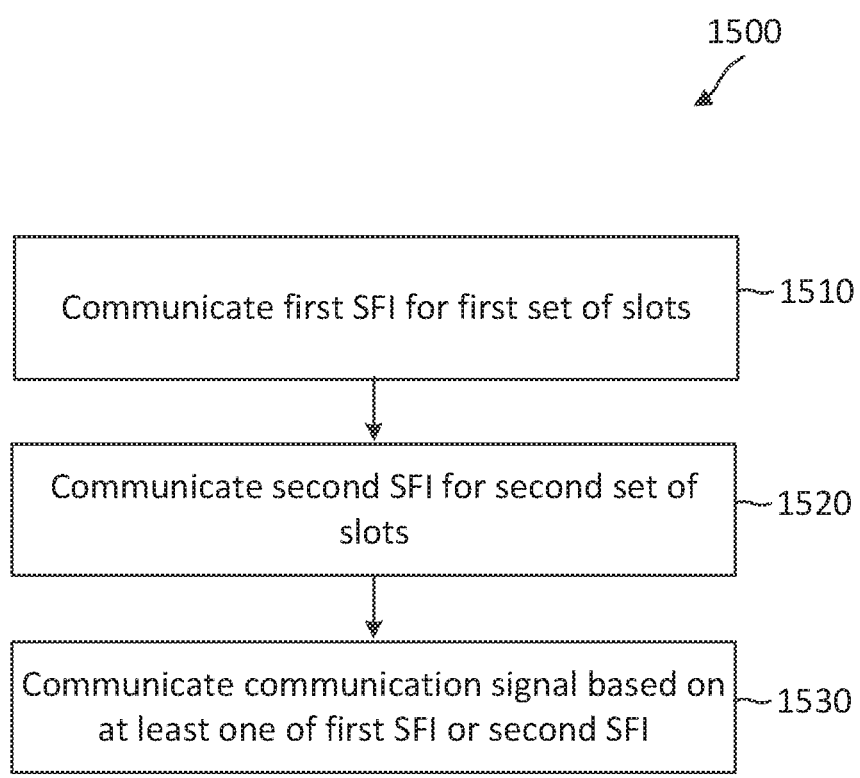
FIG. 15 is a flow diagram of a communication method according to embodiments of the present disclosure.

FIG. 15 is a flow diagram of a communication method 1500 according to embodiments of the present disclosure. Steps of the method 1500 can be executed by a computing device (e.g., a processor, processing circuit, and/or other suitable component) of a wireless communication device, such as the BSs 105 and 400 and the UEs 115 and 300. The method 1500 may employ similar mechanisms as in the configurations 200, 500, 900, 1000, 1100, 1200, the schemes 600, 700, 800, and the method 1300 described with respect to FIGS. 2, 5, 9, 10, 11, 12, 6, 7, 8, and 13, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes communicating, by a first wireless communication device with a second wireless communication device, a first SFI (e.g., the SFI 520a) for a first set of slots (e.g., the slots 510 in the SFI period 502a). In some instances, the first wireless communication device may be a BS and the second wireless communication device may be a UE. In some other instances, the first wireless communication device may be a UE and the second wireless communication device may be a BS.

At step 1520, the method 1500 includes communicating, by the first wireless communication device with the second wireless communication device, a second SFI (e.g., the SFI 520b) for a second set of slots (e.g., the slots 510 in the SFI period 502a). The second set of slots may overlap with the first set of slots in at least one of time or frequency, for example, as shown in the configurations 500 and 1400.

At step 1530, the method 1500 includes communicating, by the first wireless communication device with the second wireless communication device, a communication signal based on at least one of the first SFI or the second SFI.

In some embodiments, the first set of slots includes at least one slot earlier in time than the second set of slots. The first set of slots and the second set of slots include at least one common slot. In some instances, the first SFI and the second SFI include common direction information (e.g., U or D) for the common slot, for example, as shown in the scheme 600.

In some embodiments, the method 1500 may further include identifying, by the first wireless communication device, a first communication direction (e.g., U, D, X, W) for the at least one common slot based on the first SFI. The method 1500 may further include identifying, by the first wireless communication device, a second communication direction (e.g., U, D, X, W) for the at least one common slot based on the second SFI. The second communication direction is different from the first communication direction. The second SFI is communicated later in time than the first SFI. The communicating the communication signal includes communicating the communication signal during the at least one common slot based on the second communication direction in the second SFI communicated later in time than the first SFI when the second communication direction is different than the first communication direction, for example, as shown in the scheme 700.

In some embodiments, the method 1500 may further include identifying, by the first wireless communication device, a communication direction for the at least one common slot based on the first SFI. The method 1500 may further include identifying, by the first wireless communication device, an unspecified communication direction for the common slot based on the second SFI. The first SFI is communicated earlier in time than the second SFI. The communicating the communication signal includes communicating the communication signal during the at least one common slot based on the communication direction in the first SFI communicated earlier in time when the second SFI includes the unspecified communication direction, for example, as shown in the scheme 800.

In some embodiments, the communicating the first SFI includes communicating the first SFI during a slot earlier in time than the first set of slots.

In some embodiments, the first SFI indicates one or more communication directions for a third set of slots in a first frequency carrier (e.g., the frequency carrier 1404a) and the first set of slots in a second frequency carrier (e.g., the frequency carrier 1404b). The second SFI indicates one or more communication directions for a fourth set of slots in a third frequency carrier (e.g., the frequency carrier 1404c) and the second set of slots in the second frequency carrier. The first frequency carrier, the second frequency carrier, and the third frequency carrier are different. In some instances, the first set of slots and the second set of slots include at least one common slot.

Figure 16:
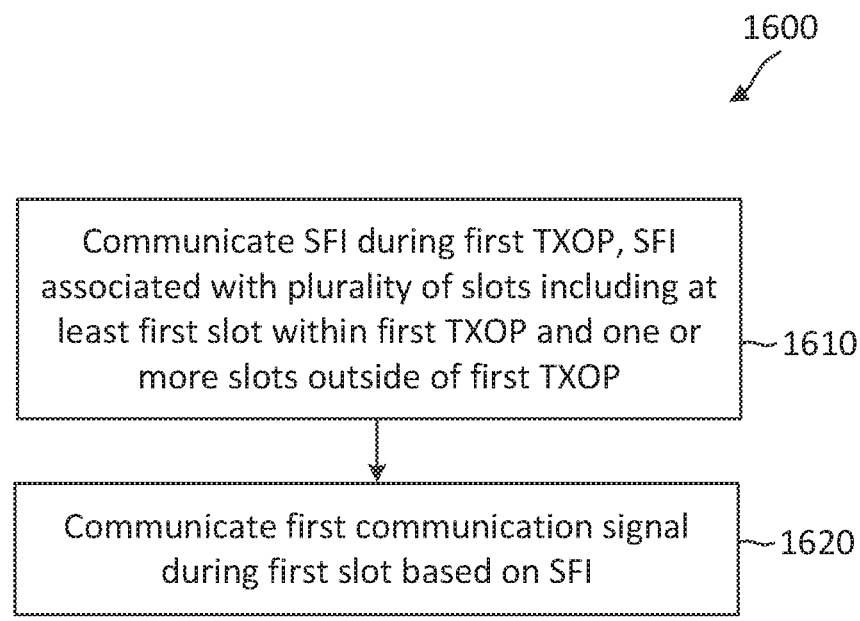
FIG. 16 is a flow diagram of a communication method according to embodiments of the present disclosure.

FIG. 16 is a flow diagram of a communication method 1600 according to embodiments of the present disclosure. Steps of the method 1600 can be executed by a computing device (e.g., a processor, processing circuit, and/or other suitable component) of a wireless communication device, such as the BSs 105 and 400 and the UEs 115 and 300. The method 1600 may employ similar mechanisms as in the configurations 200, 500, 900, 1000, 1100, 1200, the schemes 600, 700, 800, and the method 1300 described with respect to FIGS. 2, 5, 9, 10, 11, 12, 6, 7, 8, and 13, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the method 1600 includes communicating, by a first wireless communication device with a second wireless communication device, an SFI (e.g., the SFIs 520, 1020, 1120, and 1220) during a first TXOP (e.g., the TXOP 1012a). The SFI is associated with a plurality of slots (e.g., the slots 510) including a first slot (e.g., the slot $510_{last}$) within the first TXOP and one or more slots outside the first TXOP. In some instances, the first wireless communication device may be a BS and the second wireless communication device may be a UE. In some other instances, the first wireless communication device may be a UE and the second wireless communication device may be a BS. At step 1620, the method 1600 includes communicating, by the first wireless communication device with the second wireless communication device, a communication signal during the first slot based on the SFI.

In some embodiments, the method 1600 may further include communicating, by the first wireless communication device with the second wireless communication device, a second communication signal during a second TXOP (e.g., the TXOP 1012b). The first TXOP and the second TXOP are spaced apart by at least the one or more slots (e.g., the slots $510_{gap}$), for example, as shown in the configuration 1000.

In some embodiments, the method 1600 may further include determining, by the first wireless communication device, a number of the one or more slots to be indicated by the SFI based on a random number for a random backoff. The method 1600 may further include configuring, by the first wireless communication device, the SFI to indicate an uplink communication direction for each of the one or more slots based on the random number. The communicating the SFI includes transmitting, by the first wireless communication device to the second wireless communication device, the SFI.

In some embodiments, the communicating the SFI includes receiving, by the first wireless communication device from the second wireless communication device, the SFI. The method 1600 may further include determining, by the first wireless communication device, that the SFI indicates an uplink communication direction for each of the one or more slots. The method 1600 may further include bypassing, by the first wireless communication device, downlink signal monitoring during the one or more slots based on the determining In some embodiments, the one or more slots include a gap time period (e.g., the gap time period 1010) between the first TXOP and a second TXOP and at least a second slot within the second TXOP, for example, as show in the configuration 1100. The method 1600 may further include communicating, by the first wireless communication device with the second wireless communication device, a second communication signal during the second slot within the second TXOP based on a communication direction for the second slot indicated by the SFI.

In some embodiments, the one or more slots are within a second TXOP. The method 1600 may further include communicating, by the first wireless communication device with the second wireless communication device, a second communication signal during the one or more slots within the second TXOP based on the SFI, for example, as shown in the configuration 1200.

Figure 17:
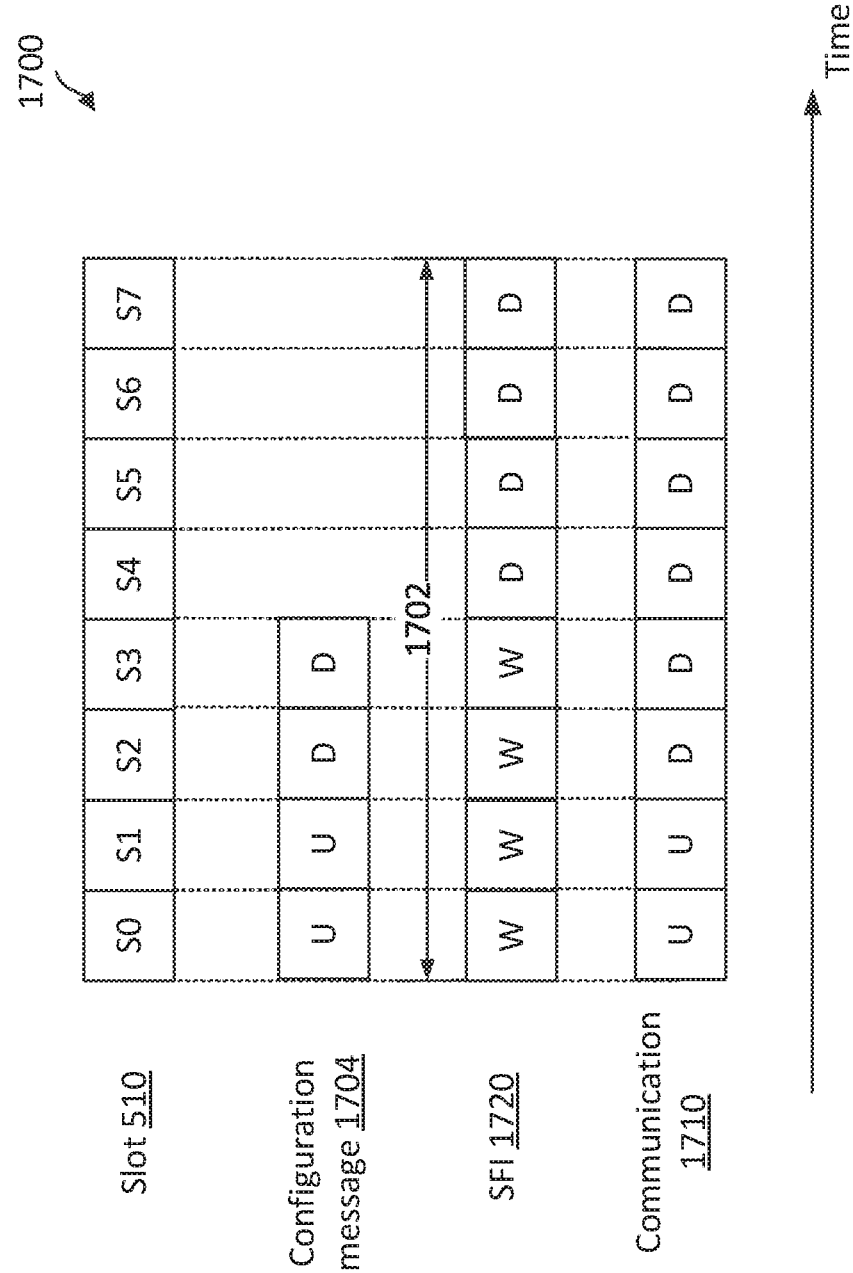
FIG. 17 illustrates a communication scheme based on semi-static slot format configurations and SFIs according to embodiments of the present disclosure.

FIG. 17 illustrates a communication scheme 1700 based on semi-static slot format configurations and SFIs according to embodiments of the present disclosure. In FIG. 17, the x-axis represents time in some constant units. The scheme 1700 may be employed by the network 100. The scheme 1700 may be implemented by BSs such as the BSs 105 and 400 and UEs such as the UEs 115 and 300. The scheme 1700 may be used in conjunction with the configurations 200, 500, 900, 1000, 1100, 1200, the schemes 600, 700, 800, and the method 1300 described with respect to FIGS. 2, 5, 9, 10, 11, 12, 6, 7, 8, and 13, respectively. The scheme 1700 may be substantially similar to the scheme 800. For example, the scheme 1700 may provide an SFI with an unspecified communication direction (e.g., the wildcard format). However, in the scheme 1700, the SFI with the unspecified communication direction may be used to maintain a communication direction in a slot configured by an earlier configuration (e.g., an RRC semi-static schedule for UL transmission or DL reception), in addition to a previous SFI. The scheme 700 is illustrated using the same slot structure as in the scheme 800.

As an example, the BS transmits a configuration message 1704 indicating UL directions (U) for the slots 510 indexed S0 and S1 and DL directions (D) for the slots 520 indexed S2 and S3. In an embodiment, the BS may semi-statically assign the slots 510 indexed S0 and S1 as UL slots and the slots 510 indexed S2 and S3 as DL slots. For example, the BS may configure a UE with a semi-static schedule for communications and the assignment may be from the scheduling. The semi-persistent schedule can be for DL or UL communications. In a DL direction, RRC can configure semi-static schedules for CSI-RS receptions and/or semi-persistent scheduling (SPS) PDSCH receptions. In a UL direction, RRC can configure semi-static schedules for SRS transmissions, PUCCH transmissions, and/or grant-free PUSCH transmissions (e.g., SPS PUSCH transmissions). Subsequently, the BS transmits an SFI 1720 (e.g., the SFIs 520) for an SFI period 1702 (e.g., the SFI periods 502). As similarly described above, the SFI 1720 can be carried by DCI via a GC-PDCCH. The BS may determine to maintain the earlier configuration for the slots 510 indexed S0 to S3 configured by the configuration message 1704. Thus, the BS may indicate an unspecified directions (W) for the slots indexed S0 to S3. The BS may further determine to assign DL directions (D) for the slots 510 indexed S4 and S7. In some embodiments, the slots 510 may be in a first frequency carrier and the BS may transmit one of the configuration message 1704 or the SFI 1720 in a second frequency carrier different from the first frequency carrier.

A UE may receive the message 1704 and may configure the slots 510 indexed S0 to S3 based on the message 1704. The UE may monitor for an SFI 1720 according to the SFI period 1702. Upon receiving the SFI 1720, the UE may determine the slot format for the slots 510 in the SFI period 1702 based on the message 1704 and the received SFI 1720. Since the SFI 1720 indicates the unspecified directions for the slots 510 indexed S0 to S3, the UE may communicate with the BS based on the message 1704. As shown by the communication 1710, the UE may communicate with the BS in a UL direction for the slots 510 indexed S0 and S1 and in a DL direction for the slots 510 indexed S2 and S3 as configured by the message 1704. The UE may communicate with the BS in a DL direction for the slots 510 indexed S4 and S7 based on the SFI 1720 as shown by the communication 1710. In general, a UE may determine a communication direction based on a DCI, an RRC configured semi-static schedule, and/or an SFI in a decreasing priority order.

Accordingly, in some instances, the UE determines the slot format for a slot based on RRC configurations and, if any, on detected DCI formats.

The scheme 1700 can provide several benefits. For example, in some networks, when a UE fails to receive an SFI for an SFI period or when a UE receives an SFI indicating a different format or different communication direction than a previous semi-static configuration (e.g., an RRC configuration including a semi-static schedule for UL and/or DL), the UE may cancel the previous semi-static configuration. Thus, in order to maintain the previous semi-static configuration, the BS is required to track and maintain the previous semi-static configuration and transmit SFIs matching the slot formats (e.g., U or D) configured by the previous semi-static configuration. For example, the BS may be required to store UE-specific slot format tables to capture entries matching the previous semi-static configuration and generate SFIs according to the stored tables. The slot format table may record the UL-to-DL switching points and/or the DL-to-UL switching points corresponding to the semi-static configuration. The storing of the tables can increase memory consumption at the BS and may require the signaling protocol to define additional SFI formats to communicate various combinations of slot format configurations.

Figure 18:
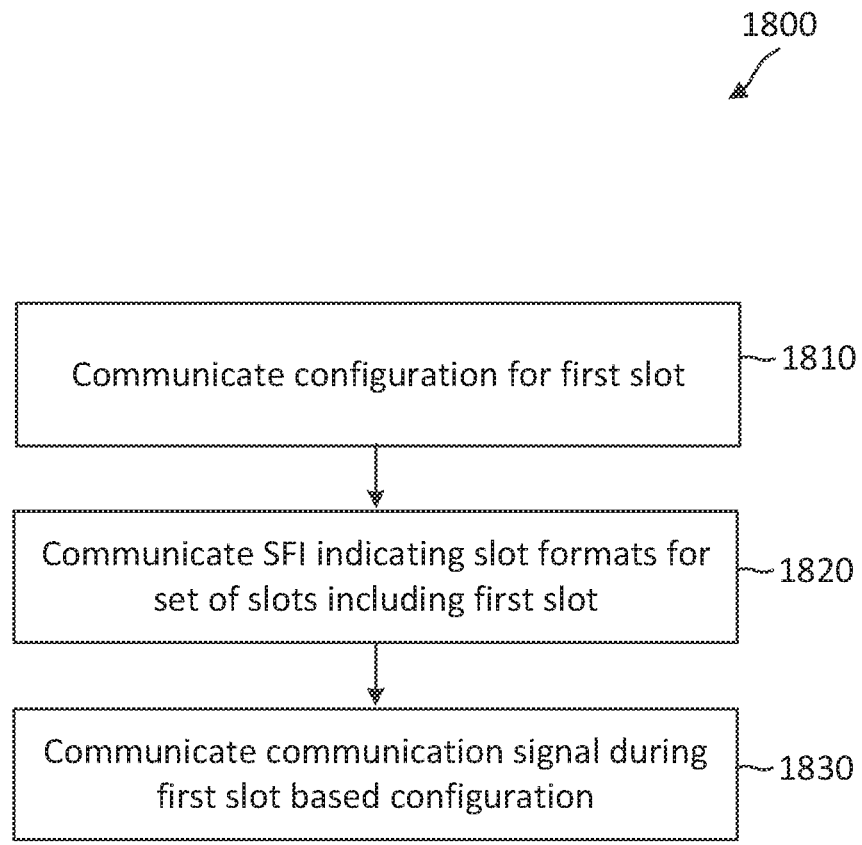
FIG. 18 is a flow diagram of a communication method according to embodiments of the present disclosure.

FIG. 18 is a flow diagram of a communication method 1800 according to embodiments of the present disclosure. Steps of the method 1800 can be executed by a computing device (e.g., a processor, processing circuit, and/or other suitable component) of a wireless communication device, such as the BSs 105 and 400 and the UEs 115 and 300. The method 1800 may employ similar mechanisms as in the scheme 1700 described with respect to FIG. 17. As illustrated, the method 1800 includes a number of enumerated steps, but embodiments of the method 1800 may include additional steps before, after, and in between the enumerated steps. In some embodiments, one or more of the enumerated steps may be omitted or performed in a different order.

At step 1810, the method 1800 includes communicating, by a first wireless communication device with a second wireless communication device, a configuration (e.g., the configuration message 1704) for a first slot (e.g., the slots 510 indexed S0 to S3).

At step 1820, the method 1800 includes communicating, by the first wireless communication device with the second wireless communication device, an SFI (e.g., the SFI 1720) indicating slot formats for a set of slots (e.g., the slots 510 indexed S0 to S7) including the first slot. The SFI indicates an unspecified slot format (e.g., a wildcard format) for the first slot. The configuration may be communicated earlier in time than the SFI.

At step 1830, the method 1800 includes communicating, by the first wireless communication device with the second wireless communication device, a communication signal (e.g., the communication 1710) based on the configuration.

In some embodiments, the first wireless communication device may be a UE and the second wireless communication device may be a BS. In such embodiments, the communicating the configuration may include receiving, by the first wireless communication device from the second wireless communication device, the configuration. The communicating the SFI may include receiving, by the first wireless communication device from the second wireless communication device, the SFI. The first wireless communication device may identify a communication direction for the first slot based on the received configuration. The first wireless communication device may identify the unspecified slot format for the first slot based on the received SFI. The communicating the communication signal may include communicating the communication signal during the first slot based on the communication direction in the configuration communicated earlier in time than the SFI including the unspecified format indication.

In some embodiments, the first wireless communication device may be a BS and the second wireless communication device may be a UE. In such embodiments, the communicating the configuration may include transmitting, by the first wireless communication device to the second wireless communication device, the configuration. The communicating the SFI may include transmitting, by the first wireless communication device to the second wireless communication device, the SFI. The first wireless communication device may determine the configuration including a communication direction for each symbol in the first slot. In some instances, different symbols with a slot may have different communication direction. The first wireless communication device may determine to maintain the communication direction for each symbol in the first slot by including the unspecified slot format for the first slot in the SFI. The communicating the communication signal may include communicating the communication signal during the first slot based on the communication direction in the configuration communicated earlier in time than the SFI including the unspecified slot format.

In some embodiments, the communicating the configuration may include communicating, by the first wireless communication device with the second wireless communication device, a radio resource control (RRC) message including a semi-static schedule for a communication between the apparatus and the second wireless communication device.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, a slot format indicator (SFI) during a first transmission opportunity (TXOP), the SFI associated with a plurality of slots including a first slot within the first TXOP and one or more slots outside the first TXOP; and communicating, by the first wireless communication device with the second wireless communication device, a communication signal during the first slot based on the SFI.

In some embodiments, the method further comprises communicating, by the first wireless communication device with the second wireless communication device, a second communication signal during a second TXOP, wherein the first TXOP and the second TXOP are spaced apart by at least the one or more slots. In some embodiments, the method further comprises determining, by the first wireless communication device, a number of the one or more slots to be indicated by the SFI based on a random number for a random backoff; and configuring, by the first wireless communication device, the SFI to indicate an uplink communication direction for each of the one or more slots based on the random number, wherein the communicating the SFI includes transmitting, by the first wireless communication device to the second wireless communication device, the SFI. In some embodiments, wherein the communicating the SFI includes receiving, by the first wireless communication device from the second wireless communication device, the SFI, and wherein the method further comprises determining, by the first wireless communication device, that the SFI indicates an uplink communication direction for each of the one or more slots; and bypassing, by the first wireless communication device, downlink signal monitoring during the one or more slots based on the determination. In some embodiments, wherein the one or more slots include a gap time period between the first TXOP and a second TXOP and at least a second slot within the second TXOP, and wherein the method further comprises communicating, by the first wireless communication device with the second wireless communication device, a second communication signal during the second slot within the second TXOP based on a communication direction for the second slot indicated by the SFI. In some embodiments, wherein the one or more slots are within a second TXOP, and wherein the method further comprises communicating, by the first wireless communication device with the second wireless communication device, a second communication signal during the one or more slots within the second TXOP based on the SFI.

Further embodiments of the present disclosure include an apparatus comprising a transceiver configured to communicate, with a second wireless communication device, a slot format indicator (SFI) during a first transmission opportunity (TXOP), the SFI associated with a plurality of slots including a first slot within the first TXOP and one or more slots outside the first TXOP; and communicate, with the second wireless communication device, a communication signal during the first slot based on the SFI.

In some embodiments, wherein the transceiver is further configured to communicate, with the second wireless communication device, a second communication signal during a second TXOP, and wherein the first TXOP and the second TXOP are spaced apart by at least the one or more slots. In some embodiments, the apparatus further comprises a processor configured to determine a number of the one or more slots to be indicated by the SFI based on a random number for a random backoff; and configure the SFI to indicate an uplink communication direction for each of the one or more slots based on the random number, wherein the transceiver is further configured to communicate the SFI by transmitting, to the second wireless communication device, the SFI. In some embodiments, wherein the transceiver is further configured to communicate the SFI by receiving, from the second wireless communication device, the SFI, and wherein the apparatus further comprises a processor configured to determine that the SFI indicates an uplink communication direction for each of the one or more slots; and bypass downlink signal monitoring during the one or more slots based on the determination. In some embodiments, wherein the one or more slots include a gap time period between the first TXOP and a second TXOP and at least a second slot within the second TXOP, and wherein the transceiver is further configured to communicate, with the second wireless communication device, a second communication signal during the second slot within the second TXOP based on a communication direction for the second slot indicated by the SFI. In some embodiments, wherein the one or more slots are within a second TXOP, and wherein the transceiver is further configured to communicate, with the second wireless communication device, a second communication signal during the one or more slots within the second TXOP based on the SFI.

Further embodiments of the present disclosure include a computer-readable medium having program code recorded thereon, the program code comprising code for causing a first wireless communication device to communicate, with a second wireless communication device, a first slot format indicator (SFI) for a first set of slots; code for causing the first wireless communication device to communicate, with the second wireless communication device, a second SFI for a second set of slots, the second set of slots overlapping with the first set of slots in at least one of time or frequency; and code for causing the first wireless communication device to communicate, with the second wireless communication device, a communication signal based on at least one of the first SFI or the second SFI.

In some embodiments, wherein the first set of slots includes at least one slot earlier in time than the second set of slots, and wherein the first set of slots and the second set of slots include at least one common slot. In some embodiments, wherein the first SFI and the second SFI include common direction information for the at least one common slot. In some embodiments, the computer-readable medium further comprises code for causing the first wireless communication device to identify a first communication direction for the at least one common slot based on the first SFI; and code for causing the first wireless communication device to identify a second communication direction for the at least one common slot based on the second SFI, the second communication direction being different from the first communication direction, wherein the second SFI is communicated later in time than the first SFI, and wherein the code for causing the first wireless communication device to communicate the communication signal is further configured to communicate the communication signal during the at least one common slot based on the second communication direction in the second SFI communicated later in time than the first SFI when the second communication direction is different than the first communication direction. In some embodiments, wherein the code for causing the first wireless communication device to communicate the first SFI is further configured to communicate the first SFI during a slot earlier in time than the first set of slots. In some embodiments, the computer-readable medium further comprises code for causing the first wireless communication device to identify a communication direction for the at least one common slot based on the first SFI; and code for causing the first wireless communication device to identify an unspecified communication direction for the common slot based on the second SFI, wherein the first SFI is communicated earlier in time than the second SFI, and wherein the code for causing the first wireless communication device to communicate the communication signal is further configured to communicate the communication signal during the at least one common slot based on the communication direction in the first SFI communicated earlier in time when the second SFI includes the unspecified communication direction. In some embodiments, wherein the first SFI indicates one or more communication directions for a third set of slots in a first frequency carrier and the first set of slots in a second frequency carrier, wherein the second SFI indicates one or more communication directions for a fourth set of slots in a third frequency carrier and the second set of slots in the second frequency carrier, and wherein the first frequency carrier, the second frequency carrier, and the third frequency carrier are different. In some embodiments, wherein the first set of slots and the second set of slots include at least one common slot. In some embodiments, wherein the code for causing the first wireless communication device to communicate the first SFI is further configured to transmit, to the second wireless communication device, the first SFI, and wherein the code for causing the first wireless communication device to communicate the second SFI is further configured to transmit, to the second wireless communication device, the second SFI. In some embodiments, wherein the code for causing the first wireless communication device to communicate the first SFI is further configured to receive, from the second wireless communication device, the first SFI, and wherein the code for causing the first wireless communication device to communicate the second SFI is further configured to receive, from the second wireless communication device, the second SFI.

Further embodiments of the present disclosure include a computer-readable medium of wireless communication, comprising code for causing a first wireless communication device to communicating, by a first wireless communication device with a second wireless communication device, a slot format indicator (SFI) during a first transmission opportunity (TXOP), the SFI associated with a plurality of slots including a first slot within the first TXOP and one or more slots outside the first TXOP; and code for causing the first wireless communication device to communicate, with the second wireless communication device, a communication signal during the first slot based on the SFI.

In some embodiments, the computer-readable medium further comprises code for causing the first wireless communication device to communicate, with the second wireless communication device, a second communication signal during a second TXOP, wherein the first TXOP and the second TXOP are spaced apart by at least the one or more slots. In some embodiments, the computer-readable medium further comprises code for causing the first wireless communication device to determine a number of the one or more slots to be indicated by the SFI based on a random number for a random backoff; and code for causing the first wireless communication device to configure the SFI to indicate an uplink communication direction for each of the one or more slots based on the random number, wherein the code for causing the first wireless communication device to communicate the SFI is further configured to transmit, to the second wireless communication device, the SFI. In some embodiments, wherein the code for causing the first wireless communication device to communicate the SFI is further configured to receive, from the second wireless communication device, the SFI, and wherein the computer-readable medium further comprises code for causing the first wireless communication device to determine that the SFI indicates an uplink communication direction for each of the one or more slots; and code for causing the first wireless communication device to bypass downlink signal monitoring during the one or more slots based on the determination. In some embodiments, wherein the one or more slots include a gap time period between the first TXOP and a second TXOP and at least a second slot within the second TXOP, and wherein the computer-readable medium further comprises code for causing the first wireless communication device to communicate, with the second wireless communication device, a second communication signal during the second slot within the second TXOP based on a communication direction for the second slot indicated by the SFI. In some embodiments, wherein the one or more slots are within a second TXOP, and wherein the computer-readable medium further comprises code for causing the first wireless communication device to communicate, with the second wireless communication device, a second communication signal during the one or more slots within the second TXOP based on the SFI.

Further embodiments of the present disclosure include an apparatus comprising means for communicating, with a second wireless communication device, a first slot format indicator (SFI) for a first set of slots; means for communicating, with the second wireless communication device, a second SFI for a second set of slots, the second set of slots overlapping with the first set of slots in at least one of time or frequency; and means for communicating, with the second wireless communication device, a communication signal based on at least one of the first SFI or the second SFI.

In some embodiments, wherein the first set of slots includes at least one slot earlier in time than the second set of slots, and wherein the first set of slots and the second set of slots include at least one common slot. In some embodiments, wherein the first SFI and the second SFI include common direction information for the at least one common slot. In some embodiments, the apparatus further comprises means for identifying a first communication direction for the at least one common slot based on the first SFI; and means for identifying a second communication direction for the at least one common slot based on the second SFI, the second communication direction being different from the first communication direction, wherein the second SFI is communicated later in time than the first SFI, and wherein the means for communicating the communication signal is further configured to communicate the communication signal during the at least one common slot based on the second communication direction in the second SFI communicated later in time than the first SFI when the second communication direction is different than the first communication direction. In some embodiments, wherein the means for communicating the first SFI is further configured to communicate the first SFI during a slot earlier in time than the first set of slots. In some embodiments, the apparatus further comprises means for identifying a communication direction for the at least one common slot based on the first SFI; and means for identifying an unspecified communication direction for the common slot based on the second SFI, wherein the first SFI is communicated earlier in time than the second SFI, and wherein the means for communicating the communication signal is further configured to communicate the communication signal during the at least one common slot based on the communication direction in the first SFI communicated earlier in time when the second SFI includes the unspecified communication direction. In some embodiments, wherein the first SFI indicates one or more communication directions for a third set of slots in a first frequency carrier and the first set of slots in a second frequency carrier, wherein the second SFI indicates one or more communication directions for a fourth set of slots in a third frequency carrier and the second set of slots in the second frequency carrier, and wherein the first frequency carrier, the second frequency carrier, and the third frequency carrier are different. In some embodiments, wherein the first set of slots and the second set of slots include at least one common slot. In some embodiments, wherein the means for communicating the first SFI is further configured to transmit, to the second wireless communication device, the first SFI, and wherein the means for communicating the second SFI is further configured to transmit, to the second wireless communication device, the second SFI. In some embodiments, wherein the means for communicating the first SFI is further configured to receive, from the second wireless communication device, the first SFI, and wherein the means for communicating the second SFI is further configured to receive, from the second wireless communication device, the second SFI.

Further embodiments of the present disclosure include an apparatus comprising means for communicating, with a second wireless communication device, a slot format indicator (SFI) during a first transmission opportunity (TXOP), the SFI associated with a plurality of slots including a first slot within the first TXOP and one or more slots outside the first TXOP; and means for communicating, with the second wireless communication device, a communication signal during the first slot based on the SFI.

In some embodiments, the apparatus further comprises means for communicating, with the second wireless communication device, a second communication signal during a second TXOP, wherein the first TXOP and the second TXOP are spaced apart by at least the one or more slots. In some embodiments, the apparatus further comprises means for determining a number of the one or more slots to be indicated by the SFI based on a random number for a random backoff; and means for configuring the SFI to indicate an uplink communication direction for each of the one or more slots based on the random number, wherein the means for communicating the SFI is further configured to transmit, to the second wireless communication device, the SFI. In some embodiments, wherein the means for communicating the SFI is further configured to receive, from the second wireless communication device, the SFI, and wherein the apparatus further comprises means for determining that the SFI indicates an uplink communication direction for each of the one or more slots; and means for bypassing downlink signal monitoring during the one or more slots based on the determination. In some embodiments, wherein the one or more slots include a gap time period between the first TXOP and a second TXOP and at least a second slot within the second TXOP, and wherein the apparatus further comprises means for communicating, with the second wireless communication device, a second communication signal during the second slot within the second TXOP based on a communication direction for the second slot indicated by the SFI. In some embodiments, wherein the one or more slots are within a second TXOP, and wherein the apparatus further comprises means for communicating, with the second wireless communication device, a second communication signal during the one or more slots within the second TXOP based on the SFI.

Further embodiments of the present disclosure include a computer-readable medium having program code recorded thereon, the program code comprising code for causing a first wireless communication device to communicate, with a second wireless communication device, a configuration for a first slot; code for causing the first wireless communication device to communicate, with the second wireless communication device, a slot format indicator (SFI) indicating slot formats for a set of slots including the first slot, wherein the SFI indicates an unspecified slot format for the first slot; and code for causing the first wireless communication device to communicate, with the second wireless communication device, a communication signal in the first slot based on the configuration.

In some embodiments, wherein the configuration is communicated earlier in time than the SFI. In some embodiments, wherein the code for causing the first wireless communication device to communicate the configuration is further configured to receive, from the second wireless communication device, the configuration, and wherein the code for causing the first wireless communication device to communicate the SFI is further configured to receive, from the second wireless communication device, the SFI. In some embodiments, the computer-readable medium further comprises code for causing the first wireless communication device to identify a communication direction for the first slot based on the received configuration; and code for causing the first wireless communication device to identify the unspecified slot format for the first slot based on the received SFI, wherein the code for causing the first wireless communication device to communicate the communication signal includes communicating the communication signal during the first slot based on the communication direction in the configuration communicated earlier in time than the SFI including the unspecified slot format. In some embodiments, wherein the code for causing the first wireless communication device to communicate the configuration is further configured to transmit, to the second wireless communication device, the configuration, and wherein the code for causing the first wireless communication device to communicate the SFI is further configured to transmit, to the second wireless communication device, the SFI. In some embodiments, the computer-readable medium further comprises code for causing the first wireless communication device to determine the configuration including a communication direction for each symbol in the first slot; and code for causing the first wireless communication device to determine to maintain the communication direction for each symbol in the first slot by including the unspecified slot format for the first slot in the SFI, wherein the code for causing the first wireless communication device to communicate the communication signal is further configured to communicate the communication signal during the first slot using the communication direction in the configuration communicated earlier in time than the SFI including the unspecified slot format. In some embodiments, wherein the code for causing the first wireless communication device to communicate the configuration is further configured to communicate, with the second wireless communication device, a radio resource control (RRC) message including a semi-static schedule for a communication between the first wireless communication device and the second wireless communication device. In some embodiments, wherein the semi-static schedule is associated with at least one a channel state information-reference signal (CSI-RS) reception, a semi-persistent scheduling (SPS) physical downlink shared channel (PDSCH) reception, a sounding reference signal (SRS) transmission, a physical uplink control channel (PUCCH) transmission, or an SPS physical uplink shared channel (PUSCH) transmission.

Further embodiments of the present disclosure include an apparatus comprising means for communicating, with a second wireless communication device, a configuration for a first slot; means for communicating, with the second wireless communication device, a slot format indicator (SFI) for indicating slot formats a set of slots including the first slot, wherein the SFI indicates an unspecified slot format for the first slot; and means for communicating, with the second wireless communication device, a communication signal in the first slot based on the configuration.

In some embodiments, wherein the configuration is communicated earlier in time than the SFI. In some embodiments, wherein the means for communicating the configuration is further configured to receive, from the second wireless communication device, the configuration, and wherein the means for communicating the SFI is further configured to receive, from the second wireless communication device, the SFI. In some embodiments, the apparatus further comprises means for identifying a communication direction for the first slot based on the received configuration; and means for identifying the unspecified slot format for the first slot based on the received SFI, wherein the means for communicating the communication signal includes communicating the communication signal during the first slot using the communication direction in the configuration communicated earlier in time than the SFI including the unspecified slot format. In some embodiments, wherein the means for communicating the configuration is further configured to transmit, to the second wireless communication device, the configuration, and wherein the means for communicating the SFI is further configured to transmit, to the second wireless communication device, the SFI. In some embodiments, the apparatus further comprises means for determining the configuration including a communication direction for each symbol in the first slot; and means for determining to maintain the communication direction for the first slot by including the unspecified slot format for each symbol in the first slot in the SFI, wherein the means for communicating the communication signal is further configured to communicate the communication signal during the first slot using the communication direction in the configuration communicated earlier in time than the SFI including the unspecified slot format. In some embodiments, wherein the means for communicating the configuration is further configured to communicate, with the second wireless communication device, a radio resource control (RRC) message including a semi-static schedule for a communication between the apparatus and the second wireless communication device. In some embodiments, wherein the semi-static schedule is associated with at least one a channel state information-reference signal (CSI-RS) reception, a semi-persistent scheduling (SPS) physical downlink shared channel (PDSCH) reception, a sounding reference signal (SRS) transmission, a physical uplink control channel (PUCCH) transmission, or an SPS physical uplink shared channel (PUSCH) transmission.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising: communicating, by a first wireless communication device with a second wireless communication device, a first slot format indicator (SFI) for a first set of slots that starts from a slot where the first SFI is communicated; communicating, by the first wireless communication device with the second wireless communication device, a second SFI for a second set of slots that starts from a slot where the second SFI is communicated, wherein the second set of slots overlaps with the first set of slots at least in time, wherein the second SFI is communicated during an overlapping time between the first set of slots and the second set of slots, and wherein the first SFI and the second SFI indicate a same communication direction for each slot in the overlapping time; and communicating, by the first wireless communication device with the second wireless communication device, a communication signal based on at least one of the first SFI or the second SFI.

2. The method of claim 1, wherein the first set of slots includes at least one slot earlier in time than the second set of slots.

3. The method of claim 1, wherein the first SFI indicates one or more communication directions for a third set of slots in a first frequency carrier and the first set of slots in a second frequency carrier, wherein the second SFI indicates one or more communication directions for a fourth set of slots in a third frequency carrier and the second set of slots in the second frequency carrier, and wherein the first frequency carrier, the second frequency carrier, and the third frequency carrier are different.

4. The method of claim 3, wherein the first set of slots and the second set of slots include at least one common slot, and wherein a communication direction of the common slot is indicated by the first SFI and the second SFI communicated in different frequency carriers.

5. An apparatus comprising: a transceiver configured to: communicate, with a second wireless communication device, a first slot format indicator (SFI) for a first set of slots that starts from a slot where the first SFI is communicated; communicate, with the second wireless communication device, a second SFI for a second set of slots that starts from a slot where the second SFI is communicated, wherein the second set of slots overlaps with the first set of slots at least in time, wherein the second SFI is communicated during an overlapping time between the first set of slots and the second set of slots, and wherein the first SFI and the second SFI indicate a same communication direction for each slot in the overlapping time; and communicate, with the second wireless communication device, a communication signal based on at least one of the first SFI or the second SFI.

6. The apparatus of claim 5, wherein the first set of slots includes at least one slot earlier in time than the second set of slots.

7. The apparatus of claim 6, wherein the first SFI indicates one or more communication directions for a third set of slots in a first frequency carrier and the first set of slots in a second frequency carrier, wherein the second SFI indicates one or more communication directions for a fourth set of slots in a third frequency carrier and the second set of slots in the second frequency carrier, and wherein the first frequency carrier, the second frequency carrier, and the third frequency carrier are different.

8. The apparatus of claim 7, wherein the first set of slots and the second set of slots include at least one common slot, and wherein a communication direction of the common slot is indicated by the first SFI and the second SFI communicated in different frequency carriers.

* * * * *